US012620111B2

(12) United States Patent　　　(10) Patent No.:　US 12,620,111 B2
Wakui　　　　　　　　　　　　　　 (45) Date of Patent:　　　May 5, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Miki Wakui, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 361 days.

(21) Appl. No.: 18/350,799

(22) Filed: Jul. 12, 2023

(65) Prior Publication Data

US 2024/0029288 A1　　　Jan. 25, 2024

(30) Foreign Application Priority Data

Jul. 21, 2022　　(JP) ................................. 2022-116752

(51) Int. Cl.
　*G06K 9/00*　　　(2022.01)
　*G06T 7/593*　　　(2017.01)
　*G06T 7/80*　　　(2017.01)
(52) U.S. Cl.
　CPC ................ *G06T 7/593* (2017.01); *G06T 7/85* (2017.01); *G06T 2207/10012* (2013.01)
(58) Field of Classification Search
　CPC . G06T 7/593; G06T 7/85; G06T 2207/10012; G06T 2207/10028;

(Continued)

(56) References Cited

U.S. PATENT DOCUMENTS 8,917,929 B2 * 12/2014 Ichimori ................... G06T 7/70
　　　　　　　　　　　　　　　　　　　　382/154
9,794,543 B2 * 10/2017 Sekiguchi .............. G06V 20/56

(Continued)

FOREIGN PATENT DOCUMENTS

CN　　　111566437 B　*　10/2021　........... H04N 13/254
EP　　　3832601 A1　　6/2021

(Continued)

OTHER PUBLICATIONS

Wegner, K. et al., "Depth estimation using modified cost function for occlusion handling" Signal, Image and Video Processing (May 2019) pp. 1539-1547, vol. 13, No. 8.

(Continued)

*Primary Examiner* — Shervin K Nakhjavan

(74) *Attorney, Agent, or Firm* — Carter, DeLuca & Farrell LLP

(57)　　　　　　ABSTRACT

An image processing apparatus obtains a first captured image from a first image capturing device and a second captured image from a second image capturing device, and a first image capturing parameter in capturing the first captured image and a second image capturing parameter in capturing the second captured image. Three-dimensional shape data indicating a shape of an object image-captured by the first and second image capturing devices is obtained. Parallax information on the first and second captured images is obtained based on a search point included in the first captured image and a corresponding point corresponding to the search point and included in the second captured image. A search target region limiting a range of a pixel set as the search point is set in the first captured image based on the first and second image capturing parameters and the three-dimensional shape data.

16 Claims, 19 Drawing Sheets

(58) Field of Classification Search
CPC .. H04N 13/106; H04N 13/128; H04N 13/239; H04N 13/246; H04N 2013/0081
See application file for complete search history.

(56)  References Cited

U.S. PATENT DOCUMENTS

| | | | | |
|---|---|---|---|---|
| 10,708,505 B2 * | 7/2020 | Taya | ..................... | H04N 23/633 |
| 10,742,958 B2 * | 8/2020 | Yamamoto | .............. | A61B 1/00 |
| 11,430,143 B2 * | 8/2022 | Dmitriev | ................... | G06T 7/55 |
| 11,803,982 B2 * | 10/2023 | Matsumoto | ............. | G06T 7/593 |
| 12,159,425 B2 * | 12/2024 | Ota | .................... | G01B 11/2545 |
| 12,361,647 B2 * | 7/2025 | Xiong | .................... | G06F 3/012 |
| 2002/0085747 A1 * | 7/2002 | Yoshigahara | .......... | G06V 10/24 |
| | | | | 382/154 |
| 2012/0294546 A1 * | 11/2012 | Sakamoto | ............ | H04N 13/161 |
| | | | | 382/238 |

| | | | | |
|---|---|---|---|---|
| 2016/0210733 A1 * | 7/2016 | Kikuchi | .................... | G06T 7/85 |
| 2018/0211402 A1 * | 7/2018 | Ciurea | .................... | G06T 7/557 |
| 2023/0230278 A1 | 7/2023 | Wakui | | |

FOREIGN PATENT DOCUMENTS

| | | | |
|---|---|---|---|
| JP | 2019138822 A | 8/2019 |
| WO | 2020183711 A1 | 9/2020 |

OTHER PUBLICATIONS

Extended European Search Report issued by the European Patent Office on Jan. 3, 2024 in corresponding EP Patent Application No. 23184713.8, pp. 1-9.
Notice of Reasons for Refusal issued by the Japanese Patent Office on Feb. 10, 2026 in corresponding JP Patent Application No. 2022-116752, with English translation.

* cited by examiner

1101

1102

1103

1104 1105

1111

1113

1114 1115

START

S301
OBTAIN PAIR OF IMAGES

S302
OBTAIN PAIR OF IMAGE CAPTURING
PARAMETERS

S303
OBTAIN THREE-DIMENSIONAL
SHAPE DATA

S304
SET SEARCH TARGET REGION

S305
GENERATE PARALLAX MAP

S1401
CORRECT THREE-DIMENSIONAL
SHAPE DATA

END

START S1401

S1501
OBTAIN PARALLAX MAP

S1502
GENERATE DEPTH MAP

S1503
SELECT ON VOXEL

S1504
OBTAIN TWO-DIMENSIONAL
COORDINATE CORRESPONDING
TO ON VOXEL

S1505
OBTAIN VOXEL DEPTH VALUE

S1506
OBTAIN MAP DEPTH VALUE

S1507
EQUAL
TO OR GREATER
THAN VOXEL DEPTH
VALUE?          NO

YES          S1508
CORRECT ON VOXEL

S1509
SELECT ALL ON VOXELS?          NO

YES

END

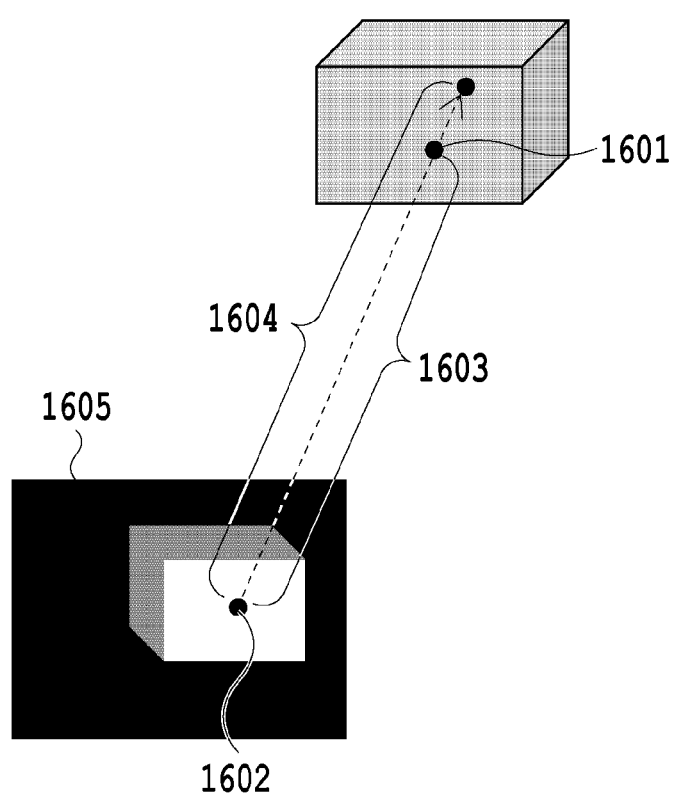
1601
1604
1603
1605
1602
FIG.16A
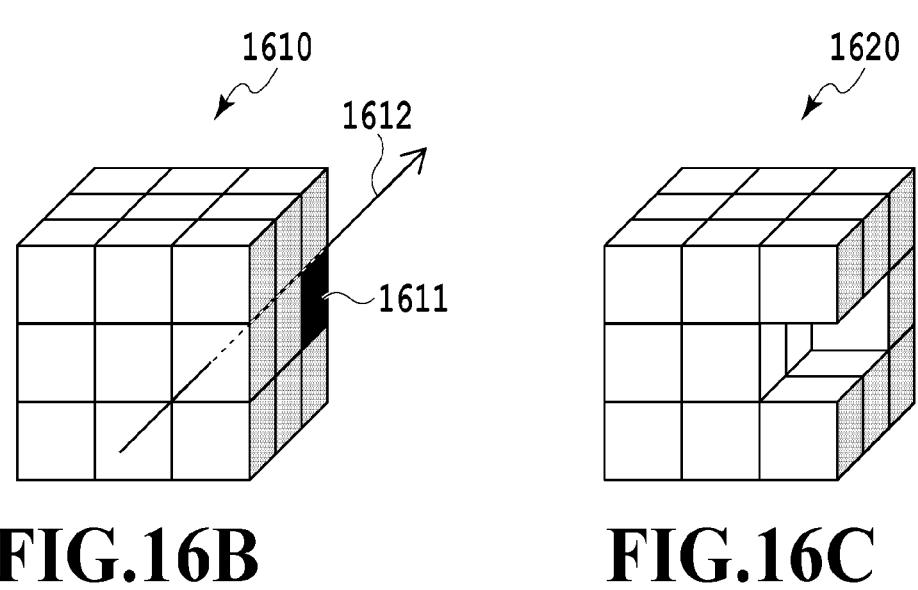
1610
1612
1611
1620
FIG.16B          FIG.16C

IMAGE PROCESSING APPARATUS, IMAGE PROCESSING METHOD, AND STORAGE MEDIUM

BACKGROUND

Field

The present disclosure relates to a technique to obtain a parallax of an object in multiple captured images.

Description of the Related Art

There has been a technique to obtain a three-dimensional shape of an object from multiple images. For example, there has been a method of obtaining distance information by the stereo matching as one of methods of obtaining information indicating a three-dimensional shape of an object in multiple images.

In the method of obtaining the distance information by the stereo matching, first, a first captured image and a second captured image are obtained by two image capturing devices corresponding to right and left image capturing devices in a stereo camera that are arranged at an interval. Next, a feature point of an object extracted from the first captured image captured by one image capturing device is used as a search point, and a corresponding point corresponding to the search point is searched and identified from the second captured image captured by the other image capturing device. Parallax information is obtained by comparing a coordinate of the search point with a coordinate of the corresponding point corresponding to the search point. Then, the obtained parallax information and an image capturing parameter such as a position and a focal length of each image capturing device are used to obtain distance information (a depth value) to the object by the principle of triangulation or the like. With the above procedure, it is possible to obtain the information indicating the three-dimensional shape of the object.

International Publication No. WO2020/183711 discloses a technique in which the parallax is predicted based on the distance to the object that is measured by using a three-dimensional measurement method, and the stereo matching is performed by setting a search range of the corresponding point in the second captured image by using the predicted parallax.

If there are multiple objects, or if the shape of the object is irregular, for example, the corresponding point corresponding to the search point of the object identified in the first captured image may not be shown in the second captured image because of being shielded by another object or by the object itself. Additionally, in some cases, the corresponding point corresponding to the search point is not shown in the second captured image because, for example, the object is not within a viewing angle of the other image capturing device like a case where the object is close to one image capturing device, which causes the corresponding point to be cut off. In such a case, in the technique disclosed in International Publication No. WO2020/183711, the stereo matching is performed by using wrong parallax information, and the correct distance information cannot be obtained in some cases. Thus, there has been a possibility of using inaccurate parallax information in the obtainment of the three-dimensional shape using multiple images.

SUMMARY

An image processing apparatus according to the present disclosure comprises: one or more hardware processors; and one or more memories storing one or more programs configured to be executed by the one or more hardware processors, the one or more programs including instructions for: obtaining a first captured image obtained by image capturing by a first image capturing device and a second captured image obtained by image capturing by a second image capturing device; obtaining a first image capturing parameter, which is an image capturing parameter in a case where the first captured image is captured, and a second image capturing parameter, which is an image capturing parameter in a case where the second captured image is captured; obtaining three-dimensional shape data indicating a shape of an object image-captured by the first image capturing device and the second image capturing device; obtaining parallax information on the first captured image and the second captured image based on a search point included in the first captured image and a corresponding point corresponding to the search point and included in the second captured image; and setting a search target region limiting a range of a pixel set as the search point in the first captured image based on the first image capturing parameter, the second image capturing parameter, and the three-dimensional shape data.

Further features of the present disclosure will become apparent from the following description of exemplary embodiments with reference to the attached drawings.

BRIEF DESCRIPTION OF THE DRAWINGS

FIG. 16A is a diagram describing an example of a voxel depth value and a map depth value obtained in the correction processing, FIG. 16B is a diagram illustrating an example of the three-dimensional shape data before the correction processing performed by the correction unit, and FIG. 16C is a diagram illustrating an example of the three-dimensional shape data after the correction processing is performed;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Embodiment 1

Figure 1:
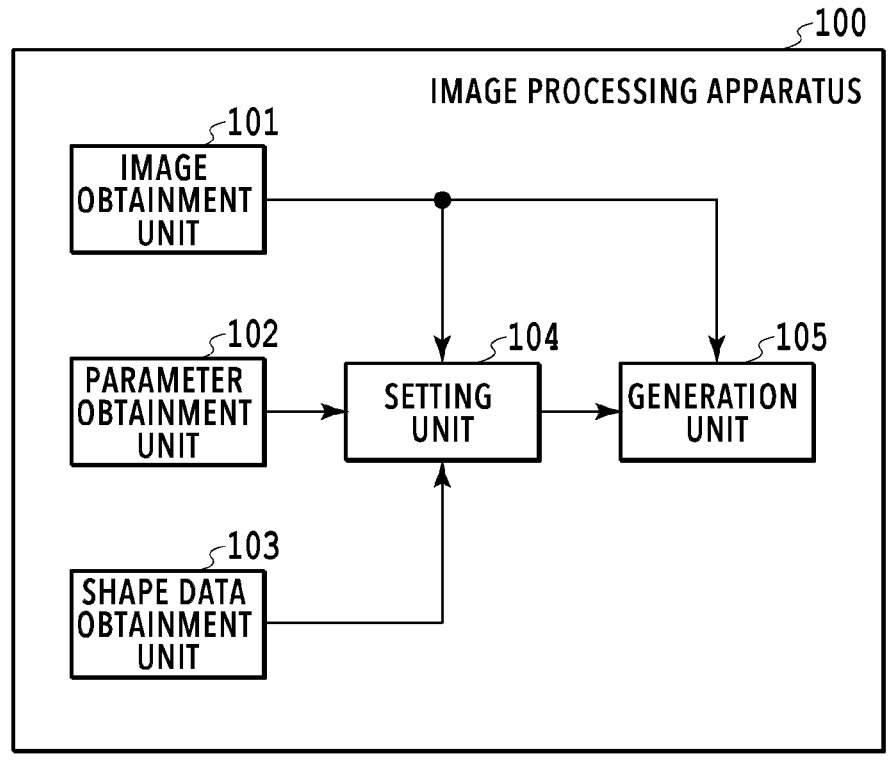
FIG. 1 is a block diagram illustrating an example of a functional configuration of an image processing apparatus according to Embodiment 1.
Figure 2:
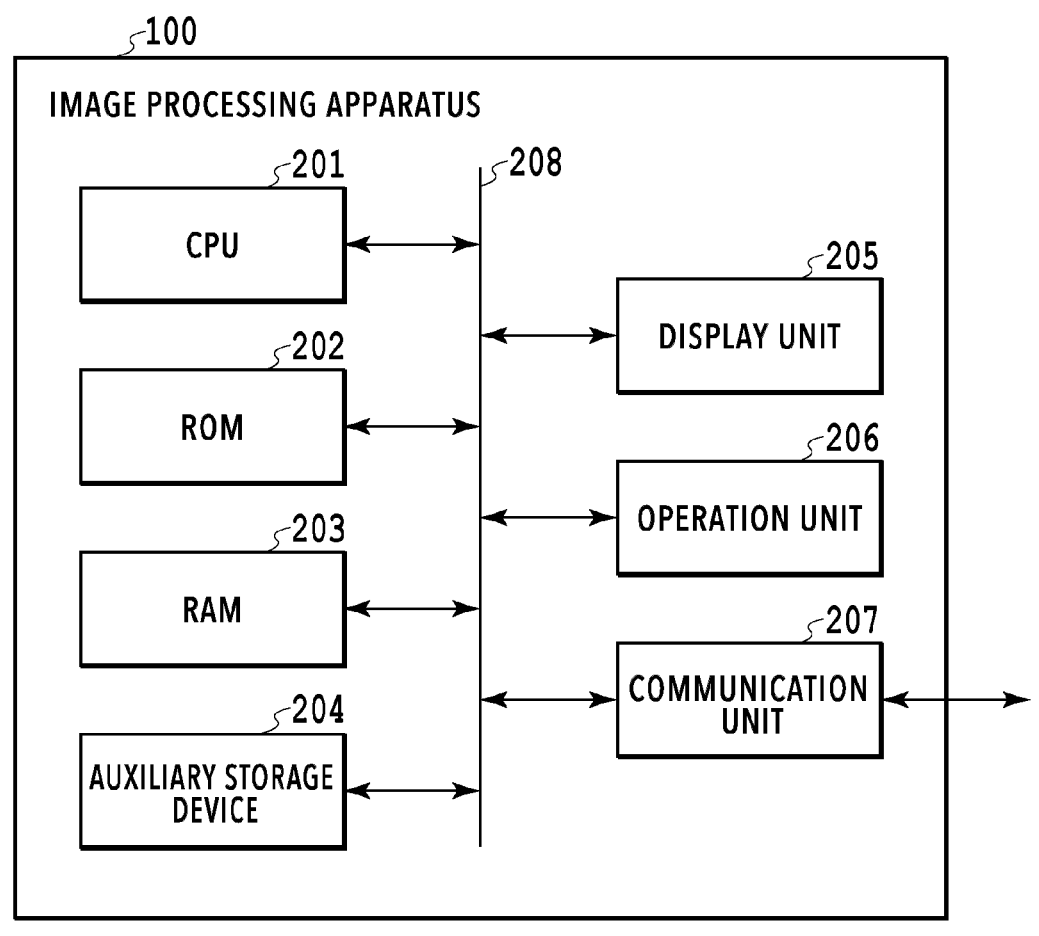
FIG. 2 is a block diagram illustrating an example of a hardware configuration of the image processing apparatus according to Embodiment 1.

A configuration of an image processing apparatus 100 according to Embodiment 1 is described with reference to FIGS. 1 and 2. FIG. 1 is a block diagram illustrating an example of a functional configuration of the image processing apparatus 100 according to Embodiment 1. The image processing apparatus 100 includes an image obtainment unit 101, a parameter obtainment unit 102, a shape data obtainment unit 103, a setting unit 104, and a generation unit 105. Processing by each unit included in the image processing apparatus 100 is implemented by hardware such as an application specific integrated circuit (ASIC) built in the image processing apparatus 100. The processing may be implemented by hardware such as a field programmable gate array (FPGA).

Additionally, the processing may be implemented by software using a memory such as a random access memory (RAM) and a processor such as a central processor unit (CPU).

Details of the processing by each unit illustrated in FIG. 1 are described later.

A hardware configuration of the image processing apparatus 100 according to Embodiment 1 in a case where each unit included in the image processing apparatus 100 operates as software is described with reference to FIG. 2. FIG. 2 is a block diagram illustrating an example of the hardware configuration of the image processing apparatus 100 according to Embodiment 1. The image processing apparatus 100 is formed of a computer, and the computer includes a CPU 201, a ROM 202, a RAM 203, an auxiliary storage device 204, a display unit 205, an operation unit 206, a communication unit 207, and a bus 208 as exemplified in FIG. 2.

The CPU 201 is a processor that functions the computer as each unit included in the image processing apparatus 100 illustrated in FIG. 1 by controlling the computer by using a program or data stored in the ROM 202, the auxiliary storage device 204, or the like. Note that, the image processing apparatus 100 includes one or more pieces of dedicated hardware different from the CPU 201, and the dedicated hardware may execute at least a part of processing by the CPU 201. An example of the dedicated hardware includes an ASIC, an FPGA, a digital signal processor (DSP), and so on. The ROM 202 is a memory that stores a program, data, and the like that do not need a change. The RAM 203 is a memory that temporarily stores the program or the data supplied from the ROM 202 or the auxiliary storage device 204 or data and the like supplied from the outside through the communication unit 207, and the RAM 203 is used as a working space in a case where the CPU 201 performs control. The auxiliary storage device 204 is formed of a hard disk drive, for example, and stores a program or various kinds of data such as image data or voice data.

The display unit 205 is formed of a liquid crystal display, an LED, or the like and displays a graphical user interface (GUI) and the like for the user to operate the image processing apparatus 100 or to browse a state of processing by the image processing apparatus 100. The operation unit 206 is formed of a keyboard, a mouse, a joystick, a touch panel, or the like and inputs various instructions to the CPU 201 in response to an operation by the user. The CPU 201 also operates as a display control unit that controls the display unit 205 and an operation control unit that controls the operation unit 206.

The communication unit 207 is used for communication such as transmission and reception of data and the like between the image processing apparatus 100 and an external device. For example, in a case where the image processing apparatus 100 establishes wired connection with the external device, a cable for communication is connected to the communication unit 207. In a case where the image processing apparatus 100 has a function of establishing wireless communication with the external device, the communication unit 207 includes an antenna. The bus 208 connects the units included in the image processing apparatus 100 as the hardware configuration and transfers information. In Embodiment 1, it is described that the display unit 205 and the operation unit 206 are included inside the image processing apparatus 100; however, at least one of the display unit 205 and the operation unit 206 may be a separate device outside the image processing apparatus 100.

<Processing by Each Functional Configuration>

The processing by each unit illustrated in FIG. 1 is described. The image obtainment unit 101 obtains data of a first captured image and a second captured image obtained with a first image capturing device and a second image capturing device concurrently image-capturing an object. Hereinafter, the first captured image and the second captured image are collectively referred to as a "pair of images". Additionally, hereinafter, the first image capturing device and the second image capturing device are collectively referred to as a pair of image capturing devices. In this case, the first image capturing device and the second image capturing device are arranged at an interval from each other, and the first image capturing device corresponds to one of right and left image capturing devices in a stereo camera while the second image capturing device corresponds to the other.

The parameter obtainment unit 102 obtains an image capturing parameter of the first image capturing device (hereinafter, referred to as a "first image capturing parameter") and an image capturing parameter of the second image capturing device (hereinafter, referred to as a "second image capturing parameter"). Hereinafter, the first image capturing parameter and the second image capturing parameter are collectively referred to as a "pair of image capturing parameters". The image capturing parameter in the present embodiment includes information indicating a position of the image capturing device, an orientation of the image capturing device, a focal length, a position of a principal point of a lens, and so on. The information indicating the orientation of the image capturing device is information indicating a direction of an optical axis of an optical system included in the image capturing device.

The shape data obtainment unit 103 obtains three-dimensional shape data indicating a shape of the object. The three-dimensional shape data is point cloud data indicating a position of a point corresponding to a surface of the object, mesh data expressing a surface shape of the object with polygon, or the like. The three-dimensional shape data may be voxel data expressing a voxel corresponding to the object as an ON voxel and expressing a voxel not corresponding to the object as an OFF voxel, for example. In the present embodiment, it is described that the shape data obtainment unit 103 obtains the voxel data obtained by using visual hull on the object as the three-dimensional shape data expressing the shape of the object.

The setting unit 104 sets a search target region based on the pair of image capturing parameters obtained by the parameter obtainment unit 102 and the three-dimensional shape data obtained by the shape data obtainment unit 103. Specifically, the setting unit 104 sets as the search target region an image region in the first captured image that corresponds to a part of the object that is in both the pair of images. The search target region is an image region in the first captured image that includes a pixel that can be set as a search point for corresponding point search in later-described processing to generate a parallax map.

The generation unit 105 generates the parallax map as parallax information. Specifically, first, the generation unit 105 sets each of multiple pixels included in the search target region in the first captured image that is set by the setting unit 104 as the search point, searches for a point in the second captured image that corresponds to the search point, and identifies the point found by the searching as a corresponding point. Next, the generation unit 105 obtains a parallax of the object shown in the pair of images based on the position of the search point in the first captured image and the position of the corresponding point corresponding to the search point in the second captured image. Finally, the generation unit 105 generates the parallax map corresponding to the first captured image in which the obtained parallax and the set search point are associated with each other.

6

<Operation of Image Processing Apparatus>

Figure 3:
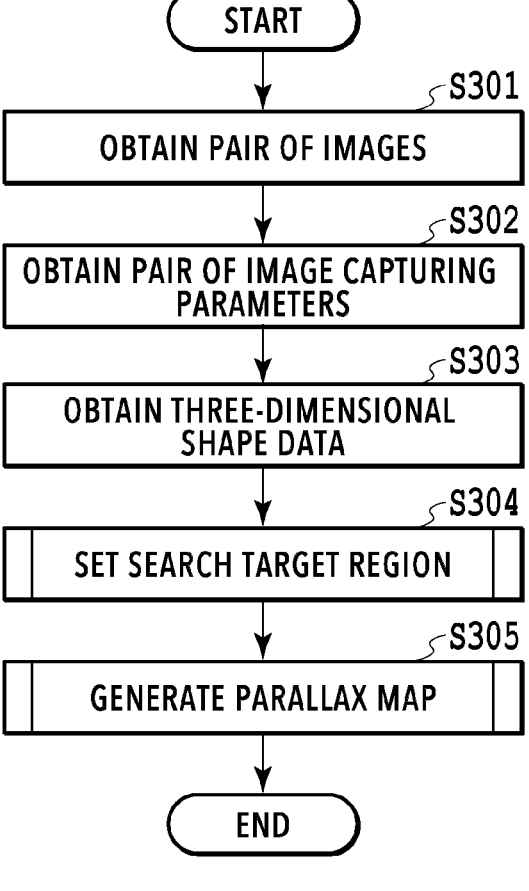
FIG. 3 is a flowchart illustrating an example of a processing flow by a CPU included in the image processing apparatus according to Embodiment 1.

An operation of the image processing apparatus 100 is described with reference to FIGS. 3 to 12. Hereinafter, it is described that the processing by each unit included in the image processing apparatus 100 as the functional configuration is executed by the CPU 201. FIG. 3 is a flowchart illustrating an example of a processing flow by the CPU 201 included in the image processing apparatus 100 according to Embodiment 1. Note that, a sign "S" in the following descriptions means a step.

First, in S301, the image obtainment unit 101 obtains the data of the pair of images. Next, in S302, the parameter obtainment unit 102 obtains the pair of image capturing parameters. Next, in S303, the shape data obtainment unit 103 obtains the three-dimensional shape data expressing the shape of the object. The data of the pair of images, the pair of image capturing parameters, and the three-dimensional shape data obtained in S301 to S303 are stored in the RAM 203 as needed.

Next, in S304, the setting unit 104 sets the search target region in the first captured image. For example, the setting unit 104 generates a binary mask image (hereinafter, referred to as a "search target region mask image") in which a value of a pixel included in an image region corresponding to the set search target region is 1, and a value of a pixel included in an image region corresponding to the outside of the search target region is 0. Data of the generated search target region mask image is stored in the RAM 203. Details of the processing in S304 are described later. Next, in S305, the generation unit 105 generates the parallax map based on the pair of images obtained in S301 and the search target region set in S304. Details of the processing in S305 are described later. After S305, the CPU 201 ends the processing of the flowchart illustrated in FIG. 3.

<Setting of Search Target Region>

Figure 4:
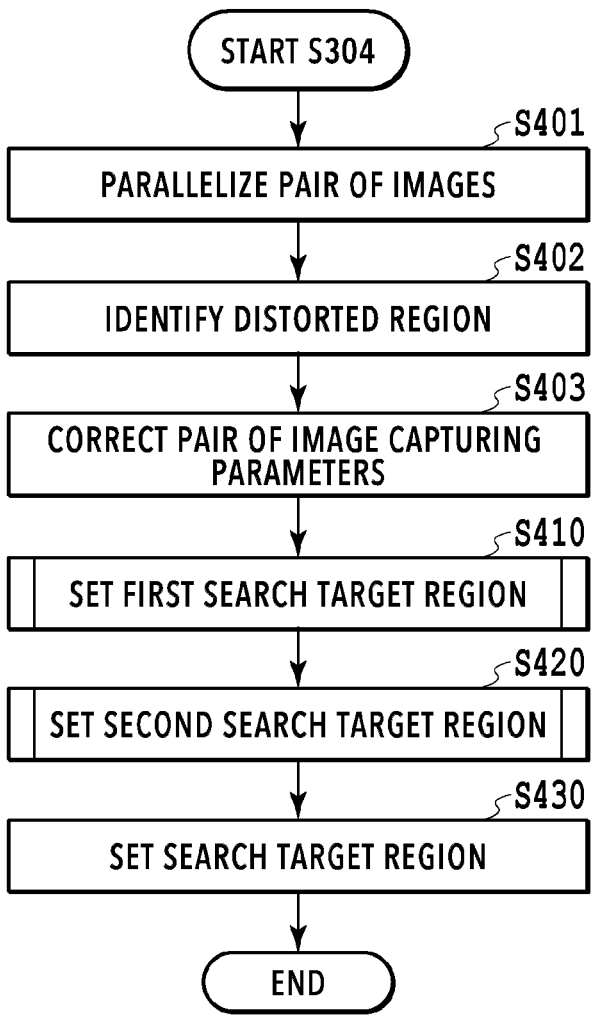
FIG. 4 is a flowchart illustrating an example of a processing flow of processing to set a search target region by a setting unit according to Embodiment 1.

The processing to set the search target region is described with reference to FIGS. 4 to 11. FIG. 4 is a flowchart illustrating an example of a processing flow of the processing to set the search target region by the setting unit 104 according to Embodiment 1, that is, the processing in S304. First, in S401, the setting unit 104 calculates a parallelization parameter by using the pair of image capturing parameters obtained in S302 and stereo-parallelizes (hereinafter, simply called "parallelize") the pair of images obtained in S301. Hereinafter, the processing to parallelize the pair of images is referred to as "parallelization processing". Specifically, the setting unit 104 calculates a first parallelization parameter used to parallelize the first captured image and a second parallelization parameter used to parallelize the second captured image. Hereinafter, the first parallelization parameter and the second parallelization parameter are collectively referred to as a "pair of parallelization parameters". In this case, the parallelization processing is processing to transform the first captured image and the second captured image such that the positions of points corresponding to each other in the first captured image and the second captured image are in horizontal positions in the images after the parallelization processing.

Specifically, for example, the setting unit 104 calculates the pair of parallelization parameters by a method as follows. In S401, first, the setting unit 104 obtains an image capturing parameter matrix C, which is a matrix of the image capturing parameters using the information indicating the focal length and the information indicating the position of the principal point of the lens included in each of the obtained first image capturing parameter and second image capturing parameter. The image capturing parameter matrix C is expressed as the following Equation 1, where a focal length in an x axis direction is $f_x$, a focal length in a y axis direction is $f_y$, and the lens principal point is ($c_x$, cy). In this case, the x axis direction and the y axis direction are directions orthogonal to each other in a plane orthogonal to the direction of the optical axis of the image capturing device, for example. More specifically, for example, the x axis direction is a direction corresponding to a transverse direction of a captured image, and the y axis direction is a direction corresponding to a longitudinal direction of a captured image.

$$C_1 = \begin{bmatrix} f_{x1} & 0 & c_{x1} \\ 0 & f_{y1} & c_{y1} \\ 0 & 0 & 1 \end{bmatrix} \quad C_2 = \begin{bmatrix} f_{x2} & 0 & c_{x2} \\ 0 & f_{y2} & c_{y2} \\ 0 & 0 & 1 \end{bmatrix} \qquad \langle \text{Equation 1} \rangle$$

In this case, $C_1$ is the image capturing parameter matrix C corresponding to the first image capturing parameter, $f_{x1}$ and $f_{y1}$ are information indicating the focal lengths, and $C_{x1}$ and $C_{y1}$ are the position of the principal point of the lens included in the first image capturing parameter. Likewise, $C_2$ is the image capturing parameter matrix C corresponding to the second image capturing parameter, $f_{x2}$ and $f_{y2}$ are information indicating the focal lengths, and $C_{x2}$ and $C_{y2}$ are the position of the principal point of the lens included in the second image capturing parameter.

In S401, subsequently, the setting unit 104 performs stereo calibration of the pair of image capturing devices by using the pair of image capturing parameters and the image capturing parameter matrix C. Specifically, for example, the setting unit 104 obtains a rotation matrix R and a translation vector t between the first image capturing device and the second image capturing device by using the information indicating the position of the image capturing device and the information indicating the orientation of the image capturing device included in the first image capturing parameter and the second image capturing parameter. The rotation matrix R and the translation vector t are expressed as the following Equation 2, where a direction vector indicating the orientation of the image capturing device (the direction of the optical axis) is f, a direction vector indicating a bottom direction is b, a direction vector indicating a right direction is r, and the position of the image capturing device is p. Note that, the direction vector r of the right direction is a cross product of the direction vector f indicating the direction of the optical axis and the direction vector b of the bottom direction. Hereinafter, it is described that the position of the image capturing device, the direction of the optical axis, and the like included in the pair of image capturing parameters are expressed by a three-dimensional coordinate in the world coordinate system. Note that, the position of the image capturing device, the direction of the optical axis, and the like are not limited to the expression by the world coordinate system, and any coordinate system may be applied as long as it implements expression that uniquely determines the position, the direction, and the like.

$$R_1 = \begin{bmatrix} r_1 \\ b_1 \\ f_1 \end{bmatrix} \quad R_2 = \begin{bmatrix} r_2 \\ b_2 \\ f_2 \end{bmatrix} \qquad \langle \text{Equation 2} \rangle$$

$$R = R_2 \cdot R_1^T$$

$$t = -R_2 \cdot p_2 + R \cdot R_1 \cdot p_1$$

In this case, $R_1$ is the rotation matrix R corresponding to the first image capturing parameter, and $r_1$, $b_1$, and $f_1$ and $p_1$ are information indicating the direction vectors indicating the right direction, the bottom direction, and the direction of the optical axis corresponding to the first image capturing parameter and the position of the first image capturing device. Likewise, $R_2$ is the rotation matrix R corresponding to the second image capturing parameter, and $r_2$, $b_2$, and $f_2$ and $p_2$ are information indicating the direction vectors indicating the right direction, the bottom direction, and the direction of the optical axis corresponding to the second image capturing parameter and the position of the second image capturing device.

In S401, subsequently, the setting unit 104 calculates a rotation matrix $R_{mat}$ in an image capturing coordinate system and a projection matrix P that converts a three-dimensional coordinate in the image capturing coordinate system into a two-dimensional coordinate in the captured image by using the image capturing parameter matrix C, the rotation matrix R, and the translation vector t. For example, the projection matrix P is expressed as the following Equation 3.

$$P_1 = \begin{bmatrix} f & 0 & c_{x1} & 0 \\ 0 & f & c_y & 0 \\ 0 & 0 & 1 & 0 \end{bmatrix} \quad P_2 = \begin{bmatrix} f & 0 & c_{x2} & B*f \\ 0 & f & c_y & 0 \\ 0 & 0 & 1 & 0 \end{bmatrix} \qquad \langle \text{Equation 3} \rangle$$

In this case, $P_1$ is a projection matrix (hereinafter, referred to as a "first projection matrix") that converts a three-dimensional coordinate in an image capturing coordinate system corresponding to the first image capturing device (hereinafter, referred to as a "first image capturing coordinate system") into a two-dimensional coordinate in the first captured image. Likewise, $P_2$ is a projection matrix (hereinafter, referred to as a "second projection matrix") that converts a three-dimensional coordinate in an image capturing coordinate system corresponding to the second image capturing device (hereinafter, referred to as a "second image capturing coordinate system") into a two-dimensional coordinate in the second captured image. Additionally, B is a base line length between the image capturing devices. Moreover, a 3×3 matrix from first to third columns in the projection matrix $P_1$ is an image capturing parameter matrix $C'_1$ in the first image capturing device after the parallelization processing, and a 3×3 matrix from first to third columns in the projection matrix $P_2$ is an image capturing parameter matrix $C'_2$ in the second image capturing device after the parallelization processing.

Note that, it is possible to calculate a direction vector f' indicating the direction of the optical axis, a direction vector b' of the bottom direction, and a direction vector r' of the right direction after the parallelization processing by using the rotation matrix $R_{mat}$, the direction vector f indicating the direction of the optical axis, the direction vector b of the bottom direction, and the direction vector r of the right direction. Specifically, for example, the direction vector f indicating the direction of the optical axis, the direction vector b' of the bottom direction, and the direction vector r' of the right direction are expressed as the following Equation 4.

$$\begin{bmatrix} r'_1 \\ f'_1 \\ b'_1 \end{bmatrix} = R_{mat1} \cdot R_1 \quad \begin{bmatrix} r'_2 \\ f'_2 \\ b'_2 \end{bmatrix} = R_{mat2} \cdot R_2 \qquad \langle \text{Equation 4} \rangle$$

In this case, $R_{mat\ 1}$ is a rotation matrix in the first image capturing coordinate system (hereinafter, referred to as a "first rotation matrix"), and $R_{mat\ 2}$ is a rotation matrix in the second image capturing coordinate system (hereinafter, referred to as a "second rotation matrix"). Additionally, $f'_1$, $b'_1$, and $r'_1$ are a direction vector indicating the direction of the optical axis and direction vectors indicating the bottom direction and the right direction in the first image capturing device after the parallelization processing. Likewise, $f'_2$, $b'_2$, and $r'_2$ are a direction vector indicating the direction of the optical axis and direction vectors indicating the bottom direction and the right direction in the second image capturing device after the parallelization processing.

In S401, finally, the setting unit 104 generates a conversion map for parallelizing the pair of captured images by using the image capturing parameter matrix C, the rotation matrix $R_{mat}$, and the projection matrix P and parallelizes the first captured image and the second captured image by using the generated conversion map. Note that, the pair of parallelization parameters are the rotation matrix $R_{mat}$ and the projection matrix P, that is, the first rotation matrix $R_{mat\ 1}$ and the first projection matrix $P_1$ and the second rotation matrix $R_{mat\ 2}$ and the second projection matrix $P_2$.

Figures 5A, 5B, 5C, 5D:
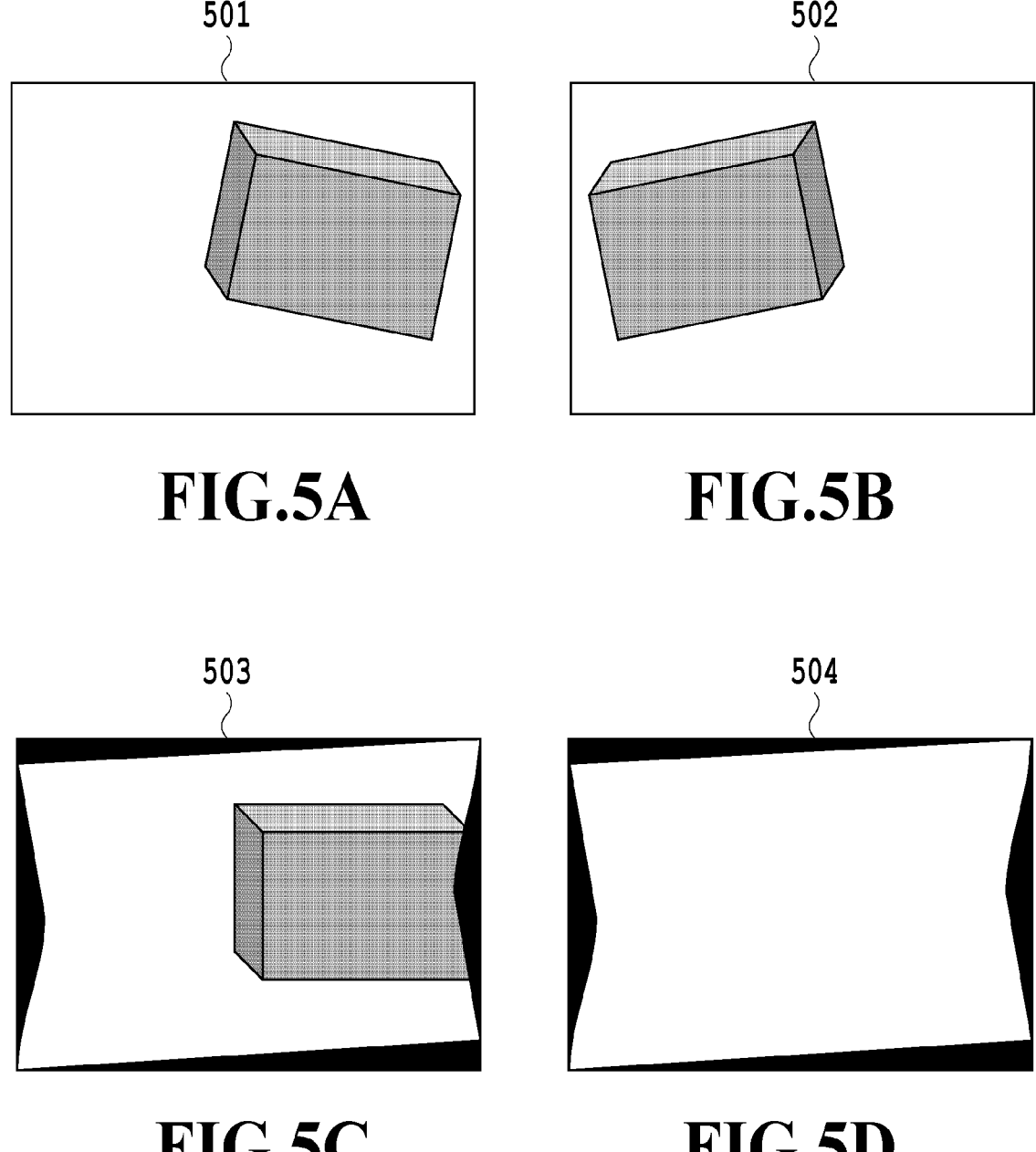
FIG. 5A is a diagram illustrating an example of a first captured image.
FIG. 5B is a diagram illustrating an example of a second captured image.
FIG. 5C is a diagram illustrating an example of an image after parallelization processing by a parallelization parameter is performed on the first captured image.
FIG. 5D is a diagram illustrating an example of an image after the parallelization processing by the parallelization parameter is performed on a white image corresponding to the first captured image.

After S401, in S402, the setting unit 104 identifies an image region at an image end in the first captured image and the second captured image in which the image region is distorted by the parallelization processing in S401 (hereinafter, referred to as a "distortion region"). The processing to identify the distortion region by the setting unit 104 is described with reference to FIGS. 5A to 5D. FIGS. 5A to 5D are diagrams describing an example of the processing to identify the distortion region by the setting unit 104 according to Embodiment 1. FIG. 5A is a diagram illustrating an example of a first captured image 501 obtained in S301, and FIG. 5B is a diagram illustrating an example of a second captured image 502 obtained in S301. Additionally, FIG. 5C is a diagram illustrating an example of an image 503 after performing the parallelization processing by the parallelization parameter on the first captured image 501.

In S401, first, the setting unit 104 generates a pair of white images in the same image size as the pair of captured images of the first captured image 501 and the second captured image 502 obtained in S301. In this case, the white image is an image in which all the pixels are white pixels (in a case where a pixel value is expressed by 8-bit, the pixel value is 255). In S401, subsequently, the setting unit 104 parallelizes the pair of white images by using the pair of parallelization parameters calculated in S401. FIG. 5D is a diagram illustrating an example of an image 504 after the parallelization processing by the parallelization parameter is performed on a white image out of the pair of white images that corresponds to the first captured image. In S401, finally, the setting unit 104 identifies that pixels of the image 504, which is the white image after the parallelization processing, are pixels in which a pixel (a black pixel in the image 504) other than the white pixel (in a case where a pixel value is expressed by 8-bit, the pixel value of other than 255) is distorted by the parallelization processing.

In this case, as exemplified in the image 503, some pixels in the image region in which the object is shown are included in the image region corresponding to the distortion region in the image 504 in some cases. Therefore, for the following processing, the setting unit 104 generates a binary mask image (hereinafter, referred to as a "distortion region mask image") in which a value of a pixel included in the image region corresponding to the distortion region is 0, and a value of a pixel included in the image region corresponding to the image region other than the distortion region is 1. Data of the generated distortion region mask image is stored in the RAM 203.

After S402, in S403, the setting unit 104 corrects the pair of image capturing parameters obtained in S302 according to the pair of captured images subjected to the parallelization processing by using the pair of parallelization parameters obtained in S401. Thus, the setting unit 104 obtains the pair of image capturing parameters after the correction (hereinafter, referred to as "corrected pair of image capturing parameters"). In the present embodiment, a mode in which the setting unit 104 performs the processing from S401 to S403 is described; however, it is not limited thereto. For example, in a case where the parallelization processing on the pair of captured images is unnecessary like a case where the parallelism of the pair of captured images obtained in S301 is sufficiently high, the CPU 201 included in the image processing apparatus 100 may omit the processing from S401 to S403.

After S403, in S410, the setting unit 104 sets the search target region (hereinafter, referred to as a "first search target region") by shield determination processing on the object shown in the pair of captured images. For example, the setting unit 104 generates a binary mask image (hereinafter, referred to as a "first search target region mask image") in which a value of a pixel included in an image region corresponding to the set first search target region is 1, and a value of a pixel included in an image region corresponding to the outside of the first search target region is 0. Data of the generated first search target region mask image is stored in the RAM 203. Details of the processing to set the first search target region by the shield determination processing are described later with reference to FIGS. 6 to 9.

After S410, in S420, the setting unit 104 sets the search target region (hereinafter, referred to as a "second search target region") by out-of-viewing angle determination processing on the object shown in the pair of captured images. For example, the setting unit 104 generates a binary mask image (hereinafter, referred to as a "second search target region mask image") in which a value of a pixel included in an image region corresponding to the set second search target region is 1, and a value of a pixel included in an image region corresponding to the outside of the second search target region is 0. Data of the generated second search target region mask image is stored in the RAM 203. Details of the processing to set the second search target region by the out-of-viewing angle determination processing are described later with reference to FIGS. 10 and 11.

After S420, in S430, the setting unit 104 sets as the search target region a region that is set as the search target region in each of the first search target region set in S410 and the second search target region set in S420. Specifically, for example, the setting unit 104 generates the search target region mask image by combining the first search target region mask image with the second search target region mask image. Data of the generated search target region mask is stored in the RAM 203. After S430, the setting unit 104 ends the processing of the flowchart illustrated in FIG. 4.

<Setting of Search Target Region by Shield Determination Processing>

Figure 6:
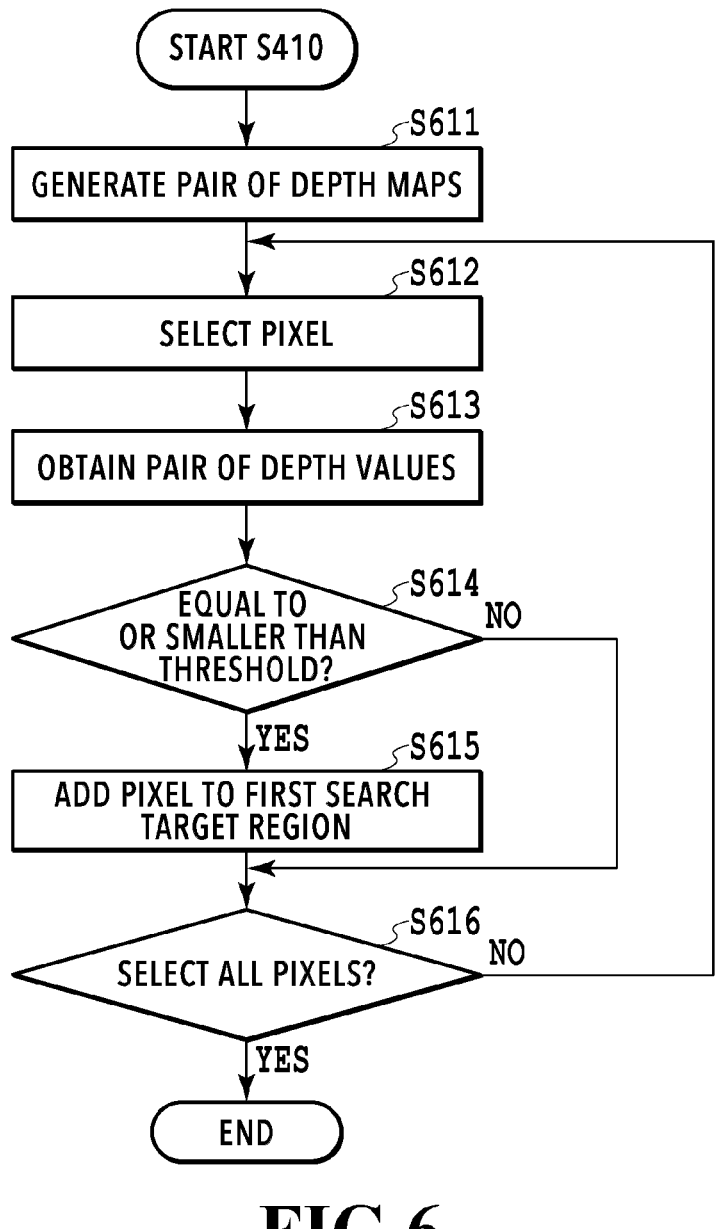
FIG. 6 is a flowchart illustrating an example of a processing flow of processing to set a first search target region by the setting unit according to Embodiment 1.
Figure 7A:
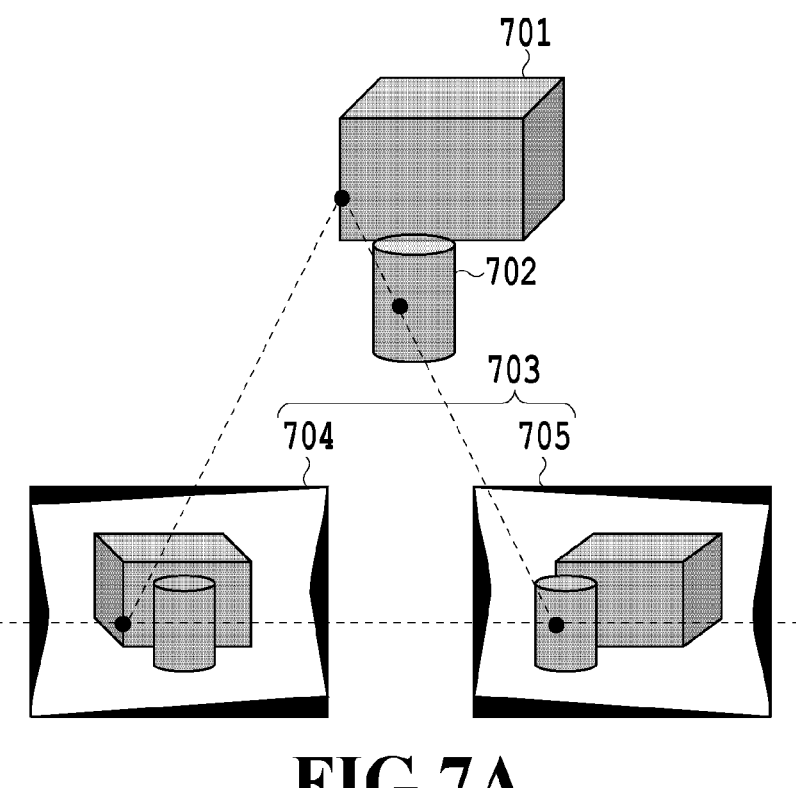
FIG. 7A is a diagram illustrating an example of a pair of images in a case of being shielded by an object in view from a pair of image capturing devices.
Figure 7B:
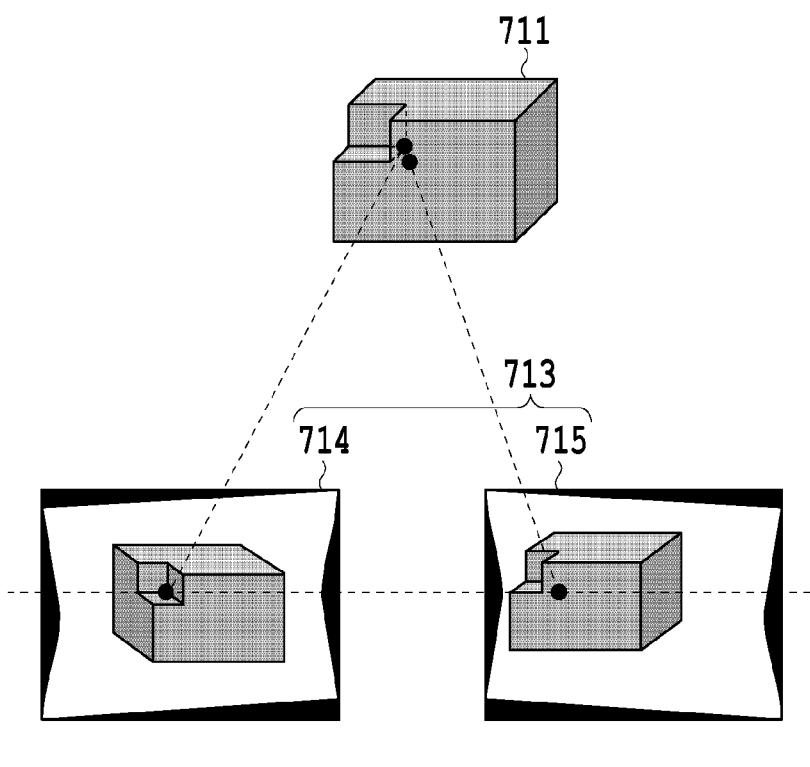
FIG. 7B is a diagram illustrating an example of a pair of images in a case where a part of an object is self-shielded by itself due to an irregular shape of the object.

The processing to set the first search target region by the shield determination processing is described with reference to FIGS. 6 to 9. FIG. 6 is a flowchart illustrating an example of a processing flow of the processing to set the first search target region by the setting unit 104 according to Embodiment 1, that is, the processing in S410. FIG. 7A is a diagram illustrating an example of a pair of images 703 in a case where an object 701 is shielded by an object 702 in view from the pair of image capturing devices. Note that, the pair of images 703 illustrated in FIG. 7A are the pair of images after the parallelization processing, an image 704 is the first captured image after the parallelization processing, and an image 705 is the second captured image after the parallelization processing. Additionally, FIG. 7B is a diagram illustrating an example of a pair of images 713 in a case where a part of an object 711 is self-shielded by the object 711 itself in view from the second image capturing device due to an irregular shape of the object 711. Note that, the pair of images 713 illustrated in FIG. 7B are the pair of images after the parallelization processing, an image 714 is the first captured image after the parallelization processing, and an image 715 is the second captured image after the parallelization processing.

Figure 8:
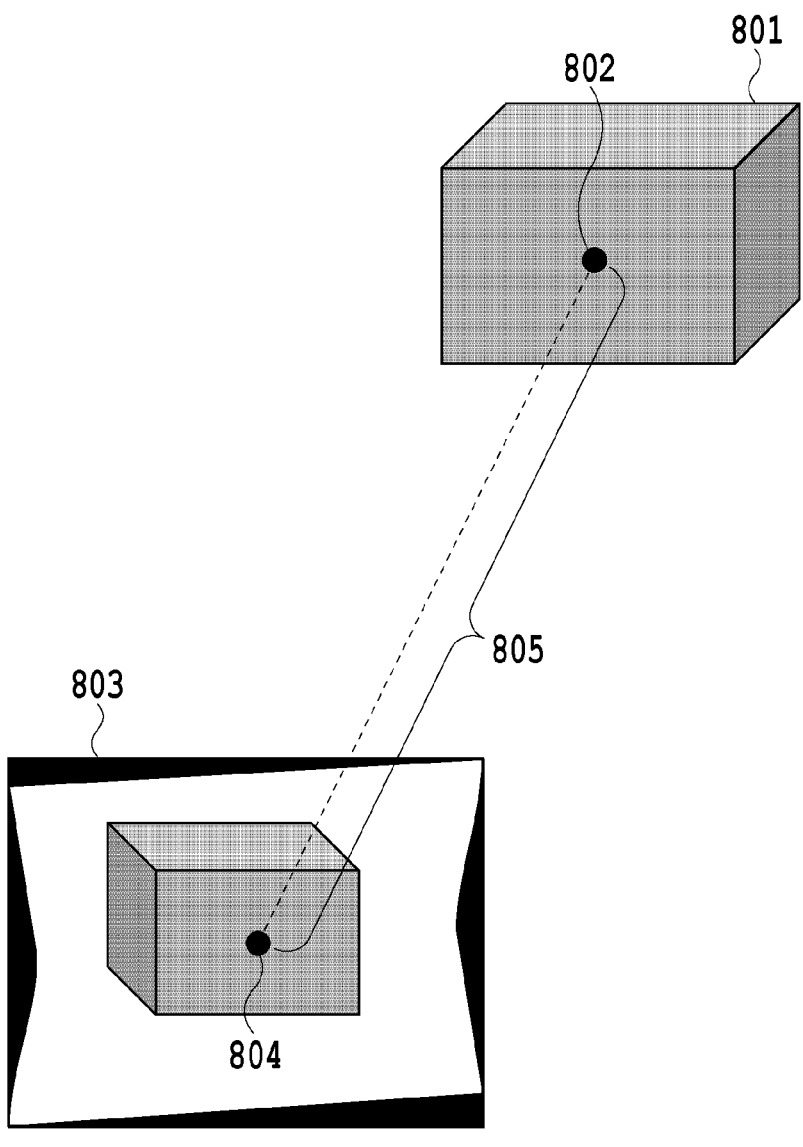
FIG. 8 is a diagram describing an example of processing to generate a first depth map by the setting unit according to Embodiment 1.

First, in S611, the setting unit 104 generates a pair of depth maps by using the corrected pair of image capturing parameters obtained in S403 and the three-dimensional shape data obtained in S303. Specifically, the setting unit 104 generates the pair of depth maps formed of a first depth map corresponding to the first captured image and a second depth map corresponding to the second captured image by using the corrected pair of image capturing parameters and the three-dimensional shape data. The processing to generate the first depth map in S611 is described with reference to FIG. 8. FIG. 8 is a diagram describing an example of the processing to generate the first depth map by the setting unit 104 according to Embodiment 1. An image 803 is the first captured image after the parallelization processing.

In S611, first, the setting unit 104 obtains a central coordinate 802 of the ON voxel corresponding to the object in three-dimensional shape data 801. In S611, subsequently, the setting unit 104 obtains a two-dimensional coordinate 804 by projecting the central coordinate 802 onto the image 803 by using the first image capturing parameter after the correction (hereinafter, referred to as a "corrected first image capturing parameter"). In S611, subsequently, the setting unit 104 obtains a depth value 805 equivalent to Euclidean distance (hereinafter, simply described as a "distance") from the two-dimensional coordinate 804 to the central coordinate 802. In S611, subsequently, the setting unit 104 associates a pixel corresponding to the two-dimensional coordinate 804 and the depth value 805 with each other.

In S611, the setting unit 104 generates the first depth map in which the depth value is the pixel value by performing the above-described processing on all the ON voxels. Note that, the setting unit 104 sets an invalid value to the pixel value of a pixel in an image region in the image 803 in which the object is not shown, that is, a pixel with no depth value corresponding to the ON voxel. In S611, subsequently, the setting unit 104 generates the second depth map by using the three-dimensional shape data 801 and the second image capturing parameter after the correction (hereinafter, referred to as a "corrected second image capturing parameter") by a method similar to the method of generating the first depth map.

Note that, in a case where there are multiple pieces of the three-dimensional shape data corresponding to multiple objects, the multiple pieces of the three-dimensional shape data are obtained in S303. If multiple depth values corresponding to the two-dimensional coordinates obtained by the projection are obtained like a case where the multiple pieces of the three-dimensional shape data are obtained or a case where the object is self-shielded by the shape thereof, for example, the setting unit 104 determines the depth value corresponding to the two-dimensional coordinate as described below. In this case, the setting unit 104 determines the minimum depth value out of the multiple depth values as the depth value corresponding to the two-dimensional coordinate and associates the pixel corresponding to the two-dimensional coordinate with the minimum depth value.

After S611, in S612, the setting unit 104 selects one pixel from the first depth map generated in S611, the pixel having a pixel value other than the invalid value and also corresponding to a pixel included in an image region other than the distortion region identified in S402. However, in a case where the setting unit 104 omits the processing from S401 to S403, the setting unit 104 selects one pixel in which the pixel value is not the invalid value from the first depth map in S612.

Figure 9:
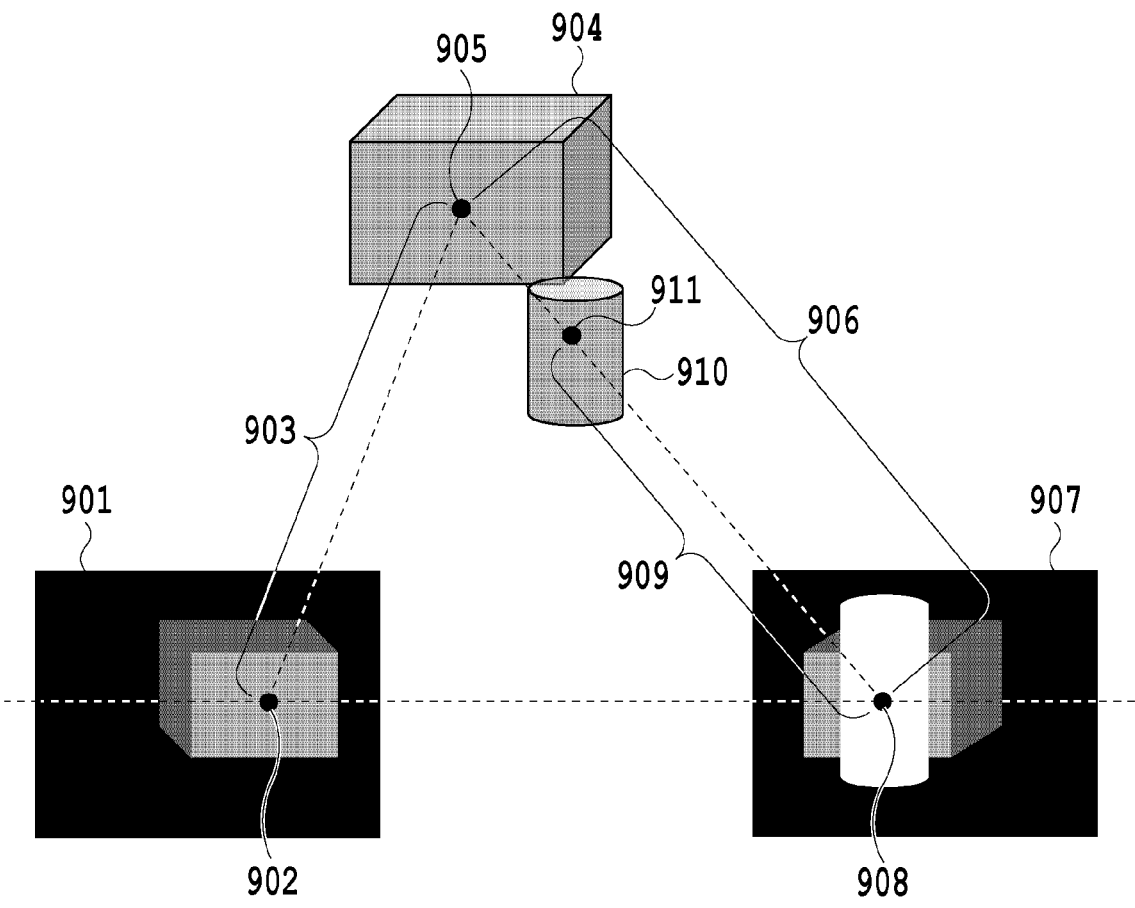
FIG. 9 is a diagram describing an example of processing to obtain a pair of depth values by the setting unit according to Embodiment 1.

Next, in S613, the setting unit 104 obtains a voxel depth value and a map depth value (hereinafter, referred to as a "pair of depth values") corresponding to the pixel selected in S611. The processing to obtain the pair of depth values is described with reference to FIG. 9. FIG. 9 is a diagram describing an example of the processing to obtain the pair of depth values by the setting unit 104 according to Embodiment 1, that is, the processing to obtain the pair of depth values in S613. In S613, first, the setting unit 104 obtains a two-dimensional coordinate 902 of the pixel in a first depth map 901 that is selected in S612, and a depth value 903 that is a pixel value of the selected pixel. In S613, subsequently, the setting unit 104 obtains a coordinate 905 of the ON voxel in three-dimensional shape data 904 that corresponds to the two-dimensional coordinate 902 by using the two-dimensional coordinate 902, the depth value 903, and the corrected first image capturing parameter obtained in S403. Specifically, the setting unit 104 obtains the coordinate 905 corresponding to the two-dimensional coordinate 902 by back-projecting the two-dimensional coordinate 902 to the three-dimensional shape data 904 by using the two-dimensional coordinate 902, the depth value 903, and the corrected first image capturing parameter.

In S613, subsequently, the setting unit 104 obtains a two-dimensional coordinate 908 in a second depth map 907 that corresponds to the coordinate 905 by projecting the coordinate 905 to the second depth map 907 by using the corrected second image capturing parameter obtained in S403. In S613, subsequently, the setting unit 104 obtains a distance from the two-dimensional coordinate 908 to the coordinate 905 as a voxel depth value 906. In S613, finally, the setting unit 104 obtains a pixel value of a pixel corresponding to the two-dimensional coordinate 908 in the second depth map 907 as the map depth value. In a case exemplified in FIG. 9, an object corresponding to three-dimensional shape data 910 is closer to the second image capturing device than an object corresponding to the three-dimensional shape data 904. Therefore, the map depth value obtained by the setting unit 104 in this case is not a depth value corresponding to the distance from the two-dimensional coordinate 908 to the coordinate 905 but a depth value corresponding to a distance from the two-dimensional coordinate 908 to a coordinate 911.

After S613, in S614, the setting unit 104 calculates a difference between the voxel depth value and the map depth value obtained in S613 and determines whether the difference is equal to or smaller than a predetermined threshold. As exemplified in FIG. 9, in a case where a part of the voxel 905 in view from the second image capturing device is shielded because the three-dimensional shape data 910 is in front of the three-dimensional shape data 904, a magnitude of the difference between the voxel depth value 906 and a map depth value 909 is great. On the other hand, in a case where there is no above-described shield, the map depth value has a value similar to the voxel depth value 906, and thus the magnitude of the difference between the voxel depth value 906 and the map depth value 909 is relatively small. The same applies to a case where a part of the object is self-shielded by the shape of the object in view from the position of the second image capturing device as exemplified in FIG. 7B. The setting unit 104 switches the following processing depending on the magnitude of the difference between the voxel depth value 906 and the map depth value 909.

If it is determined in S614 that the difference is equal to or smaller than the threshold, in S615, the setting unit 104 adds the pixel selected in S612 to the first search target region. After S615, or if it is determined in S614 that the difference is not equal to or smaller than the threshold, that is, if it is determined in S614 that the difference is greater than the threshold, in S616, the setting unit 104 determines whether all the pixels that should be selected in S612 are selected. If it is determined in S616 that all the pixels are not selected, the setting unit 104 returns to the processing in S612, and in S612, the setting unit 104 selects a pixel that is not selected yet. Thereafter, until it is determined in S616 that all the pixels are selected, the setting unit 104 repeatedly executes the processing from S612 to S616. If it is determined in S616 that all the pixels are selected, the setting unit 104 ends the processing of the flowchart illustrated in FIG. 6. Note that, if the setting unit 104 omits the processing from S401 to S403, the setting unit 104 uses the pair of image capturing parameters obtained in S302 instead of the corrected pair of image capturing parameters in the processing from S611 to S616.

<Setting of Search Target Region by Out-of-Viewing Angle Determination Processing>

Figure 10:
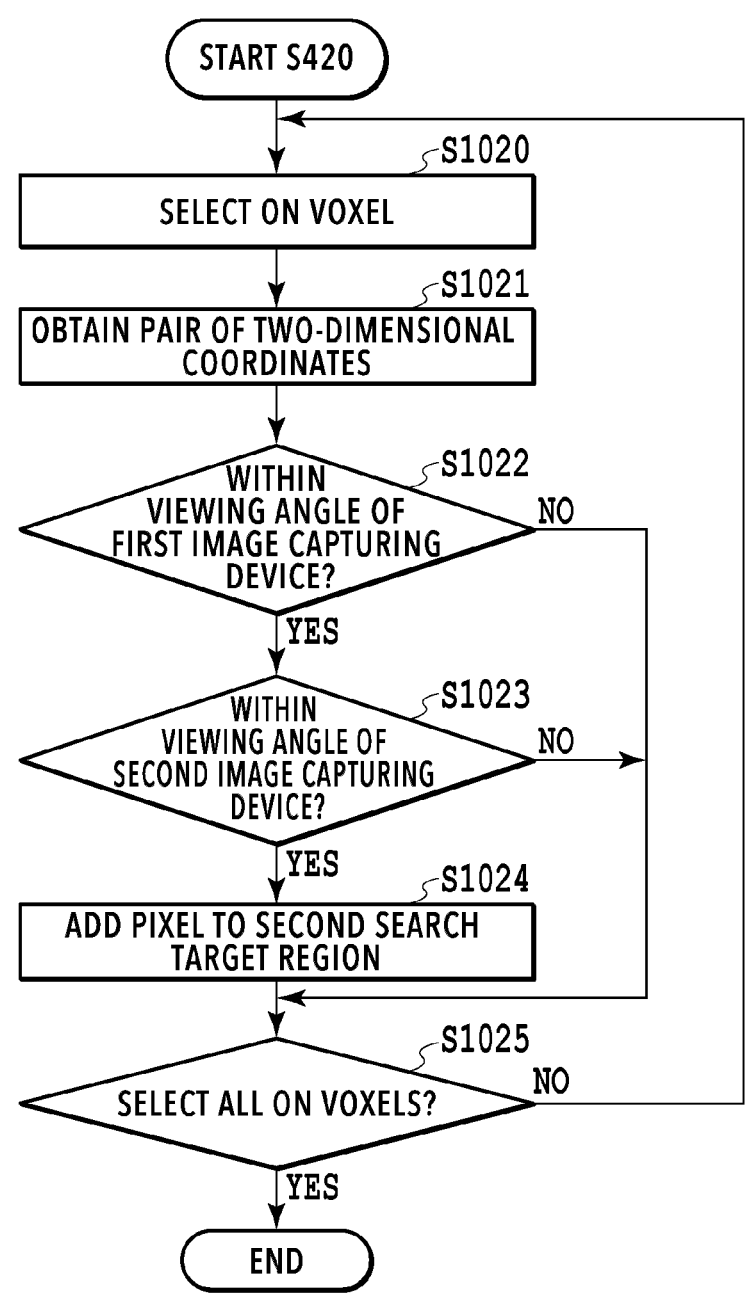
FIG. 10 is a flowchart illustrating an example of a processing flow of processing to set a second search target region by the setting unit according to Embodiment 1.
Figure 11A:
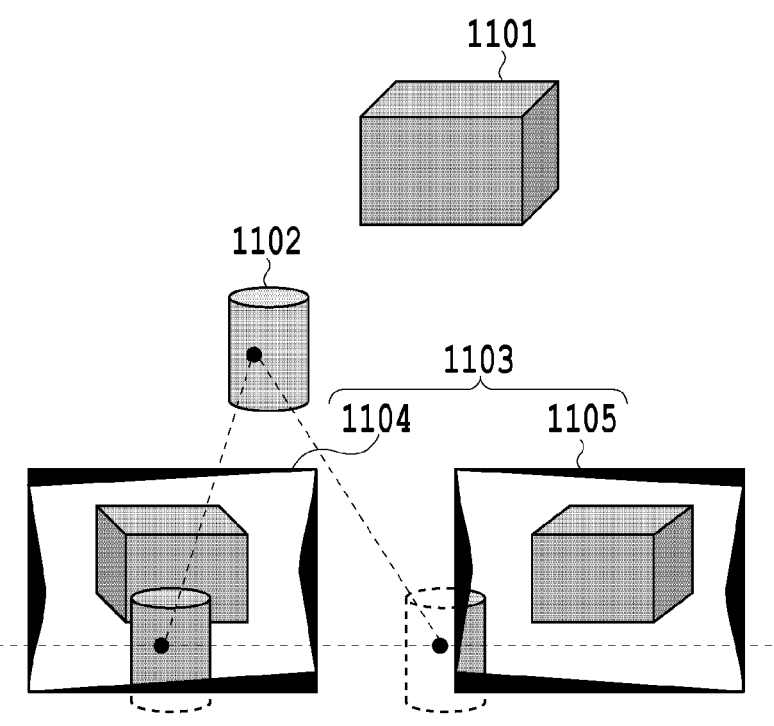
FIG. 11A is a diagram illustrating an example of a pair of images in a case where an object is close to one image capturing device.

The processing to set the second search target region by the out-of-viewing angle determination processing is described with reference to FIGS. 10 and 11. FIG. 10 is a flowchart illustrating an example of a processing flow of the processing to set the second search target region by the setting unit 104 according to Embodiment 1, that is, the processing in S420. FIG. 11A is a diagram illustrating an example of a pair of images 1103 in a case where an object 1102 is close to one image capturing device (for example, the first image capturing device). Note that, the pair of images 1103 illustrated in FIG. 11A are the pair of images after the parallelization processing, an image 1104 is the first captured image after the parallelization processing, and an image 1105 is the second captured image after the parallelization processing.

Figure 11B:
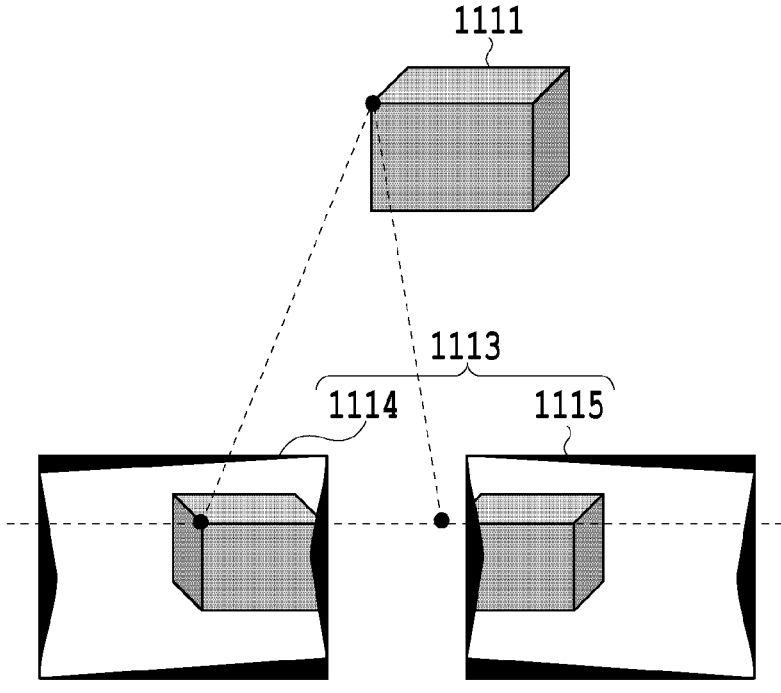
FIG. 11B is a diagram illustrating an example of the pair of images in a case where a magnitude of a distance between the pair of image capturing devices is relatively greater than a magnitude of a distance between the pair of image capturing devices and the object.

Additionally, FIG. 11B is a diagram illustrating an example of a pair of images 1113 in a case where a magnitude of a distance between the pair of image capturing devices is relatively greater than a magnitude of a distance from the pair of image capturing devices to an object 1111. Note that, the pair of images 1113 illustrated in FIG. 11B are the pair of images after the parallelization processing, an image 1114 is the first captured image after the parallelization processing, and an image 1115 is the second captured image after the parallelization processing. In a case exemplified in FIG. 11B, a part of the object 1111 shown in the image 1114 corresponding to the first captured image is not shown in the image 1115 corresponding to the second captured image and is out of the viewing angle of the second image capturing device.

First, in S1020, the setting unit 104 selects one ON voxel corresponding to the object in the three-dimensional shape data obtained in S303. Next, in S1021, the setting unit 104 obtains first and second two-dimensional coordinates (hereinafter, referred to as "two-dimensional coordinates") corresponding to a central coordinate of the ON voxel selected in S1020. Specifically, the setting unit 104 obtains as the first two-dimensional coordinate a two-dimensional coordinate obtained by projecting the central coordinate of the ON voxel selected in S1020 to the first captured image after the parallelization processing by using the corrected first image capturing parameter obtained in S403. Additionally, the setting unit 104 obtains as the second two-dimensional coordinate a two-dimensional coordinate obtained by projecting the central coordinate of the ON voxel selected in S1020 to the second captured image after the parallelization processing by using the corrected second image capturing parameter obtained in S403.

After S1021, in S1022, the setting unit 104 determines whether the first two-dimensional coordinate obtained in S1021 is within the viewing angle of the first image capturing device. If it is determined in S1022 that the first two-dimensional coordinate is within the viewing angle of the first image capturing device, in S1023, the setting unit 104 determines whether the second two-dimensional coordinate obtained in S1021 is within the viewing angle of the second image capturing device. If it is determined in S1023 that the second two-dimensional coordinate is within the viewing angle of the second image capturing device, in S1024, the setting unit 104 adds a pixel corresponding to the first two-dimensional coordinate obtained in S1021 to the second search target region.

After S1024, if it is determined in S1022 that the first two-dimensional coordinate is not within the viewing angle of the first image capturing device, or if it is determined in S1023 that the second two-dimensional coordinate is not within the viewing angle of the second image capturing device, the setting unit 104 executes processing in S1025. In S1025, the setting unit 104 determines whether all the ON voxels in the three-dimensional shape data are selected in S1020. If it is determined in S1025 that not all the ON voxels are selected, the setting unit 104 returns to the processing in S1020, and in S1020, the setting unit 104 selects an ON voxel that is not selected yet. Thereafter, until it is determined in S1025 that all the ON voxels are selected, the setting unit 104 repeatedly executes the processing from S1020 to S1025. If it is determined in S1025 that all the ON voxels are selected, the setting unit 104 ends the processing of the flowchart illustrated in FIG. 10. Note that, if the setting unit 104 omits the processing from S401 to S403, the setting unit 104 uses the pair of image capturing parameters obtained in S302 instead of the corrected pair of image capturing parameters in the processing from S1020 to S1025.

In the present embodiment, it is described that the setting unit 104 sets the region that is a combination of the first search target region and the second search target region as the search target region; however, the method of setting the search target region is not limited thereto. For example, the setting unit 104 may obtain only the first search target region to set only the first search target region as the search target region or may obtain only the second search target region to set the second search target region as the search target region.

<Generation of Parallax Map>

Figure 12:
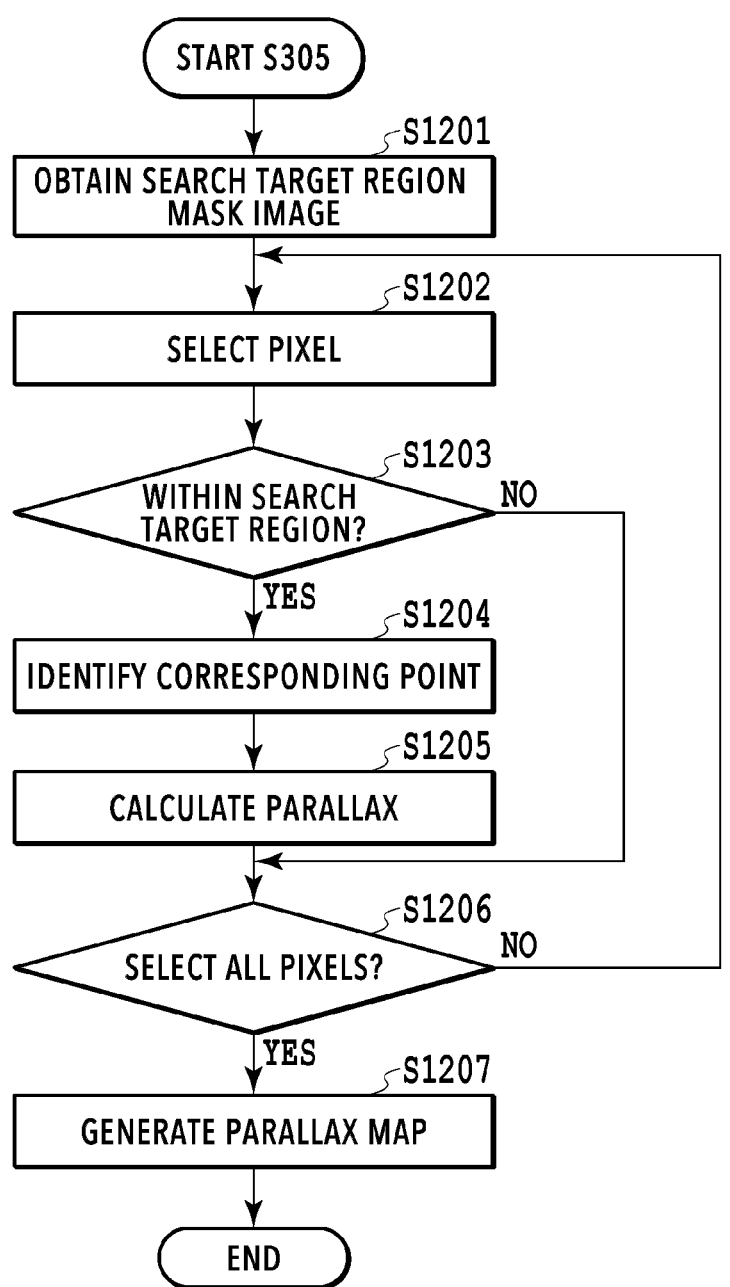
FIG. 12 is a flowchart illustrating an example of a processing flow of processing to generate a parallax map by a generation unit according to Embodiment 1.

The processing to generate the parallax map is described with reference to FIG. 12. FIG. 12 is a flowchart illustrating an example of a processing flow of the processing to generate the parallax map in the generation unit 105 according to Embodiment 1, that is, the processing in S305. First, in S1201, the generation unit 105 obtains information indicating the search target region in the first captured image set in S304. In the present embodiment, the generation unit 105 obtains data of the search target region mask image as the information indicating the search target region. Next, in S1202, the generation unit 105 selects one pixel from the first captured image. Next, in S1203, the generation unit 105 determines whether the pixel selected in S1202 is a pixel within the search target region.

If it is determined in S1203 that the pixel is in the search target region, in S1204, the generation unit 105 sets the pixel selected in S1202 as the search point and searches for and identifies the corresponding point corresponding to the search point from the second captured image. For example, the corresponding point is identified by searching for a combination in which a cost value between pixels is the minimum. For example, the generation unit 105 obtains the cost value by calculating a difference, a color difference, or the like between a pixel value of a region including a pixel of the search point and a pixel in the vicinity thereof and a pixel value of a region including each pixel in the second captured image and a pixel in the vicinity thereof. In this case, the difference, the color difference, or the like between the pixel values are calculated by using the sum of absolute difference (SAD) or the sum of squared difference (SSD), for example. Additionally, the generation unit 105 may obtain the cost value by calculating a cost value aggregated by using the semi-global matching algorithm.

After S1204, in S1205, the generation unit 105 calculates as the parallax a distance between the two-dimensional coordinate of the search point set in S1204 in the first captured image and the two-dimensional coordinate of the corresponding point identified in S1204 in the second captured image. The generation unit 105 associates the calculated parallax with a pixel corresponding to the search point in the parallax map. After S1205, or if it is determined in S1203 that the pixel is not within the search target region, in S1206, the generation unit 105 determines whether all the pixels in the first captured image are selected in S1202. If it is determined in S1206 that not all the pixels are selected, the generation unit 105 returns to the processing in S1202, and in S1202, the generation unit 105 selects a pixel that is not selected yet. Thereafter, until it is determined in S1206 that all the pixels are selected, the generation unit 105 repeatedly executes the processing from S1202 to S1206.

If it is determined in S1206 that all the pixels are selected, in S1207, the generation unit 105 generates the parallax map. Specifically, the generation unit 105 generates the parallax map corresponding to the first captured image by using the two-dimensional coordinate of the search point set in S1204 and the parallax that is calculated and associated with the search point in S1205. Note that, the generation unit 105 sets an invalid value for the parallax associated with each pixel included in an image region outside the search target region. After S1207, the generation unit 105 ends the processing of the flowchart illustrated in FIG. 12.

According to the image processing apparatus 100 formed as described above, it is possible to limit a range of the pixel set as the search point to an image region including the pixel of the search point including the corresponding point corresponding to the search point. Thus, it is possible to reduce incorrect identification of the corresponding point. As a result, it is possible to improve an accuracy of the parallax obtained by the stereo matching. Additionally, since it is possible to reduce the number of the pixels set as the search point before searching for the corresponding point, it is possible to reduce a calculation amount necessary for identifying all the corresponding points.

Note that, it is described in the present embodiment that, only in a case where the pixel selected in S1203 is the pixel within the search target region, the generation unit 105 sets the pixel as the search point to search for the corresponding point and generates the parallax map. However, the method of setting the search point is not limited thereto. For example, each of all the pixels of the first captured image may be set as the search point. In this case, the generation unit 105 first searches for the corresponding point by setting each of all the pixels as the search point and generates the parallax map. Next, the generated parallax map is masked by using the search target region mask image generated in S430, and the parallax outside the search target region is invalidated.

Embodiment 2

Figure 13:
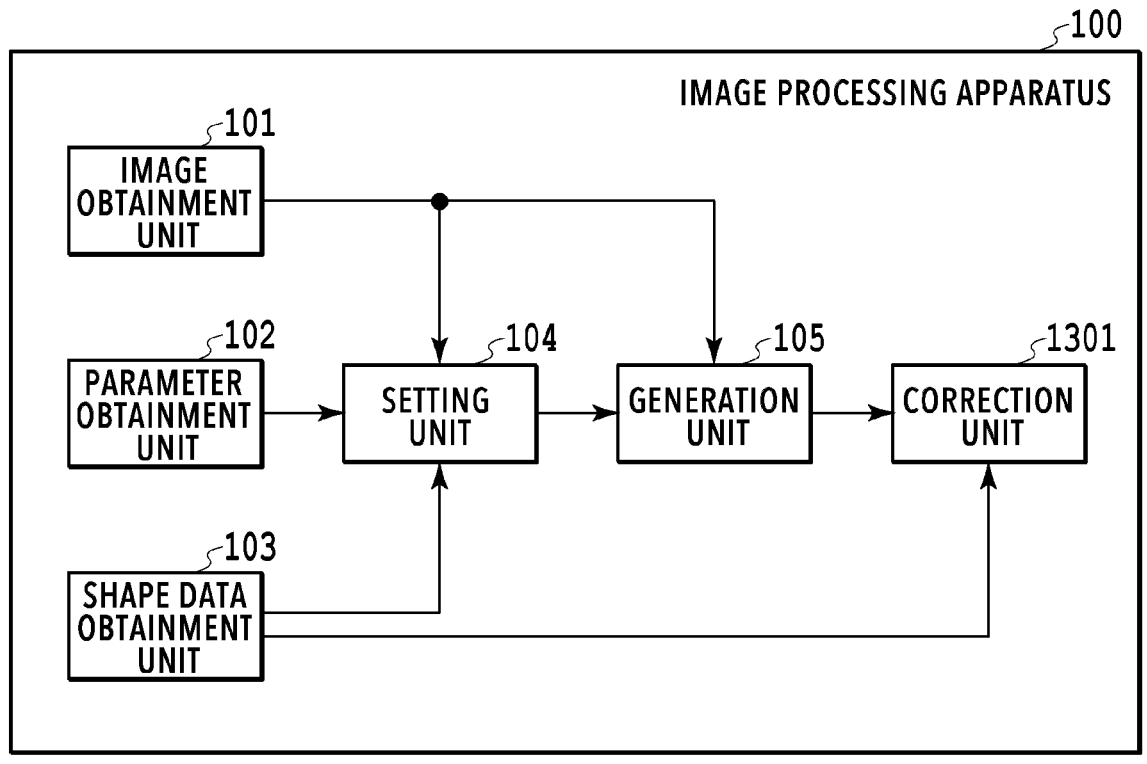
FIG. 13 is a block diagram illustrating an example of a functional configuration of the image processing apparatus according to Embodiment 2.

The image processing apparatus 100 according to Embodiment 2 is described with reference to FIGS. 13 to 16. First, a configuration of the image processing apparatus 100 according to Embodiment 2 is described with reference to FIG. 13. FIG. 13 is a block diagram illustrating an example of a functional configuration of the image processing apparatus 100 according to Embodiment 2 (hereinafter, simply described as the "image processing apparatus 100"). The image processing apparatus 100 is the image processing apparatus 100 according to Embodiment 1 to which a correction unit 1301 is added. The image processing apparatus 100 according to Embodiment 1 generates the parallax map. In contrast, the image processing apparatus 100 corrects the three-dimensional shape data by using the generated parallax map. Note that, hereinafter, a configuration similar to the configuration included in the image processing apparatus 100 according to Embodiment 1 and processing similar to the processing by the image processing apparatus 100 according to Embodiment 1 are denoted by the same reference numerals, and descriptions are omitted.

The correction unit 1301 corrects the three-dimensional shape data obtained by the shape data obtainment unit 103 by using the parallax map generated by the generation unit 105. Note that, as with the image processing apparatus 100 according to Embodiment 1, the processing of each unit included in the image processing apparatus 100 and illustrated in FIG. 13 is implemented by hardware such as an ASIC or an FPGA built in the image processing apparatus 100. Additionally, the processing may be implemented by software using a memory such as the RAM 203 and a processor such as the CPU 201.

<Operation of Image Processing Apparatus>

Figure 14:
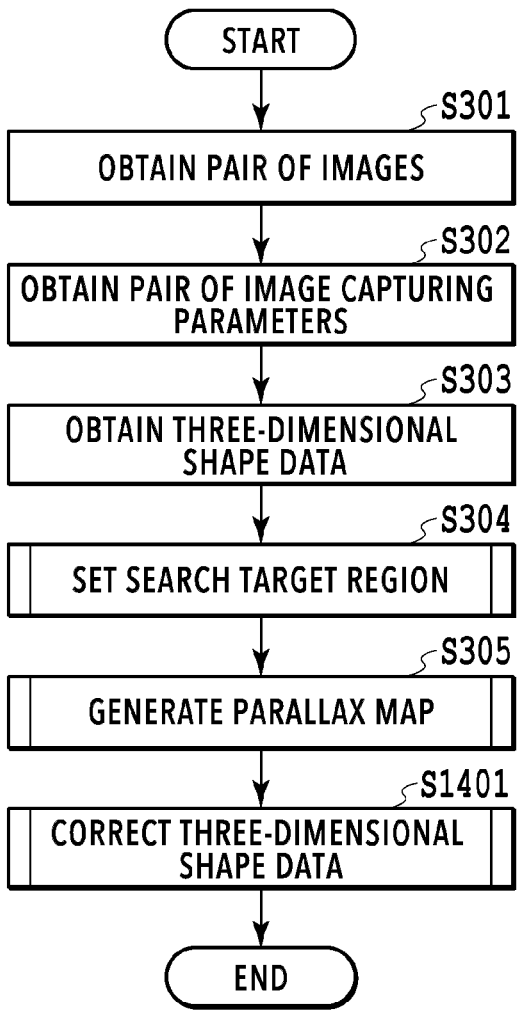
FIG. 14 is a flowchart illustrating an example of a processing flow by the CPU included in the image processing apparatus according to Embodiment 2.
Figure 15:
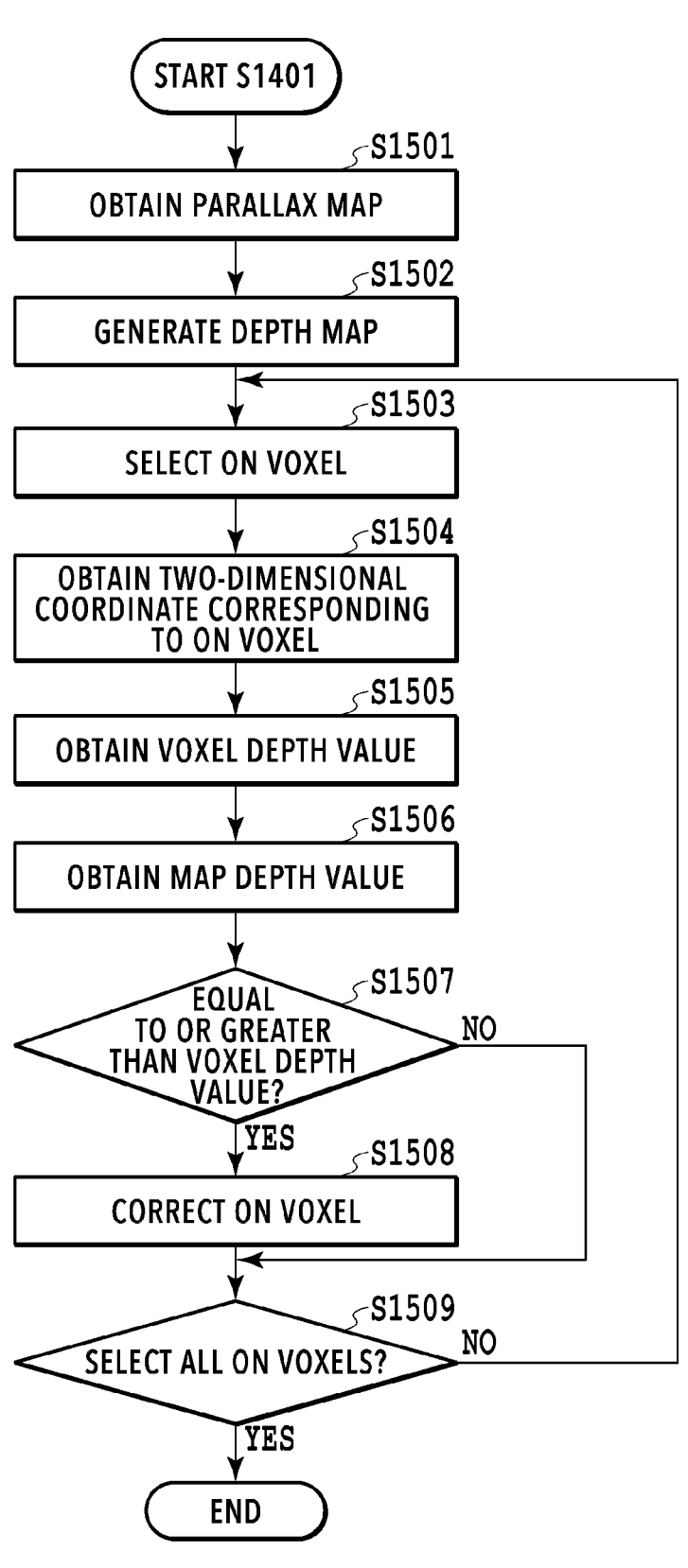
FIG. 15 is a flowchart illustrating an example of a processing flow of processing to correct three-dimensional shape data by a correction unit according to Embodiment 2.

An operation of the image processing apparatus 100 is described with reference to FIGS. 14 to 16. Hereinafter, it is described that the processing by each unit included in the image processing apparatus 100 as the functional configuration is executed by the CPU 201. FIG. 14 is a flowchart illustrating an example of a processing flow of the CPU 201 included in the image processing apparatus 100 according to Embodiment 2. First, the CPU 201 executes the processing from S301 to S305. After S305, in S1401, the correction unit 1301 corrects the three-dimensional shape data obtained in S303 by using the parallax map generated in S305. Details of the processing in S1401 are described later. After S1401, the CPU 201 ends the processing of the flowchart illustrated in FIG. 14.

<Processing to Correct Three-Dimensional Shape Data>

The processing to correct the three-dimensional shape data by the correction unit 1301 is described with reference to FIGS. 15 and 16. FIG. 15 is a flowchart illustrating an example of a processing flow of the processing to correct the three-dimensional shape data by the correction unit 1301 according to Embodiment 2, that is, the processing in S1401. FIGS. 16A to 16C are diagrams describing an example of a method of the processing to correct the three-dimensional shape data by the correction unit 1301 according to Embodiment 2. Specifically, FIG. 16A is a diagram describing an example of a voxel depth value 1603 and a map depth value 1604 obtained in the correction processing by the correction unit 1301 according to Embodiment 2. First, in S1501, the correction unit 1301 obtains the parallax map generated in S305. Next, in S1502, a depth map 1605 is generated by using the parallax map obtained in S1501. Specifically, in S1502, first, the correction unit 1301 converts the parallax in each pixel of the parallax map obtained in S1501 into the depth value by the principle of triangulation by using the corrected pair of image capturing parameters obtained in S403. In S1502, subsequently, the correction unit 1301 generates the depth map 1605 based on the depth value obtained by the conversion.

After S1502, in S1503, the correction unit 1301 selects one ON voxel corresponding to the object in the three-dimensional shape data obtained in S303. After S1503, in S1504, the correction unit 1301 obtains a two-dimensional coordinate 1602 corresponding to the ON voxel selected in S1503 by using the corrected pair of image capturing parameters obtained in S403. Specifically, in S1504, the correction unit 1301 first obtains a central coordinate 1601 of the ON voxel selected in S1503. In S1504, subsequently, the correction unit 1301 obtains the two-dimensional coordinate 1602 in a case of projecting the obtained central coordinate 1601 to the depth map 1605 by using the corrected pair of image capturing parameters obtained in S403. After S1504, in S1505, the correction unit 1301 calculates a distance between the central coordinate 1601 and the two-dimensional coordinate 1602 obtained in S1504 and obtains the calculated distance as the voxel depth value 1603. After S1505, in S1506, the correction unit 1301 obtains the depth value of a pixel corresponding to the two-dimensional coordinate 1602 obtained in S1504 as the map depth value 1604.

After S1506, in S1507, the correction unit 1301 determines whether the map depth value 1604 obtained in S1506 is equal to or greater than the voxel depth value 1603 obtained in S1505. If it is determined in S1507 that the map depth value 1604 is equal to or greater than the voxel depth value 1603, in S1508, the correction unit 1301 corrects the three-dimensional shape data obtained in S303 by performing correction to change the ON voxel to the OFF voxel.

The processing in S1508 is described with reference to FIGS. 16B and 16C. FIG. 16B is a diagram illustrating an example of three-dimensional shape data 1610 before the correction processing by the correction unit 1301 according to Embodiment 2 is performed, and FIG. 16C is a diagram illustrating an example of three-dimensional shape data 1620 after the correction processing is performed. Note that, each of multiple cubes illustrated in FIGS. 16B and 16C expresses the ON voxel. Additionally, in FIG. 16B, an ON voxel 1611 is an ON voxel corresponding to the three-dimensional coordinate calculated from the map depth value and the corrected first image capturing parameter. The correction unit 1301 changes an ON voxel closer to the side of the first image capturing device than the ON voxel 1611 on an optical axis 1612 of the first image capturing device into the OFF voxel. Thus, the correction unit 1301 corrects the three-dimensional shape data 1610 to the three-dimensional shape data 1620.

After S1508, in S1509, the correction unit 1301 determines whether all the ON voxels corresponding to the object of the three-dimensional shape data are selected in S1503. If it is determined in S1509 that not all the ON voxels are selected, the correction unit 1301 returns to S1503, and in S1503, the correction unit 1301 selects an ON voxel that is not selected yet. Hereinafter, until it is determined in S1509 that all the ON voxels are selected, the correction unit 1301 repeatedly executes the processing from S1503 to S1509. If it is determined in S1509 that all the ON voxels are selected, the correction unit 1301 ends the processing of the flowchart illustrated in FIG. 15. Note that, if the setting unit 104 omits the processing from S401 to S403, the correction unit 1301 uses the first image capturing parameter obtained in S302 instead of the corrected pair of image capturing parameters in the processing in S1401.

According to the image processing apparatus 100 formed as described above, it is possible to generate the highly accurate parallax map by limiting a range of the pixel set as the search point to an image region including the pixel of the search point including the corresponding point corresponding to the search point. Additionally, according to the image processing apparatus 100 formed as described above, it is possible to accurately recreate the irregularity and the like of the three-dimensional shape data by correcting the three-dimensional shape data by using the generated highly accurate parallax map.

Embodiment 3

Figure 17:
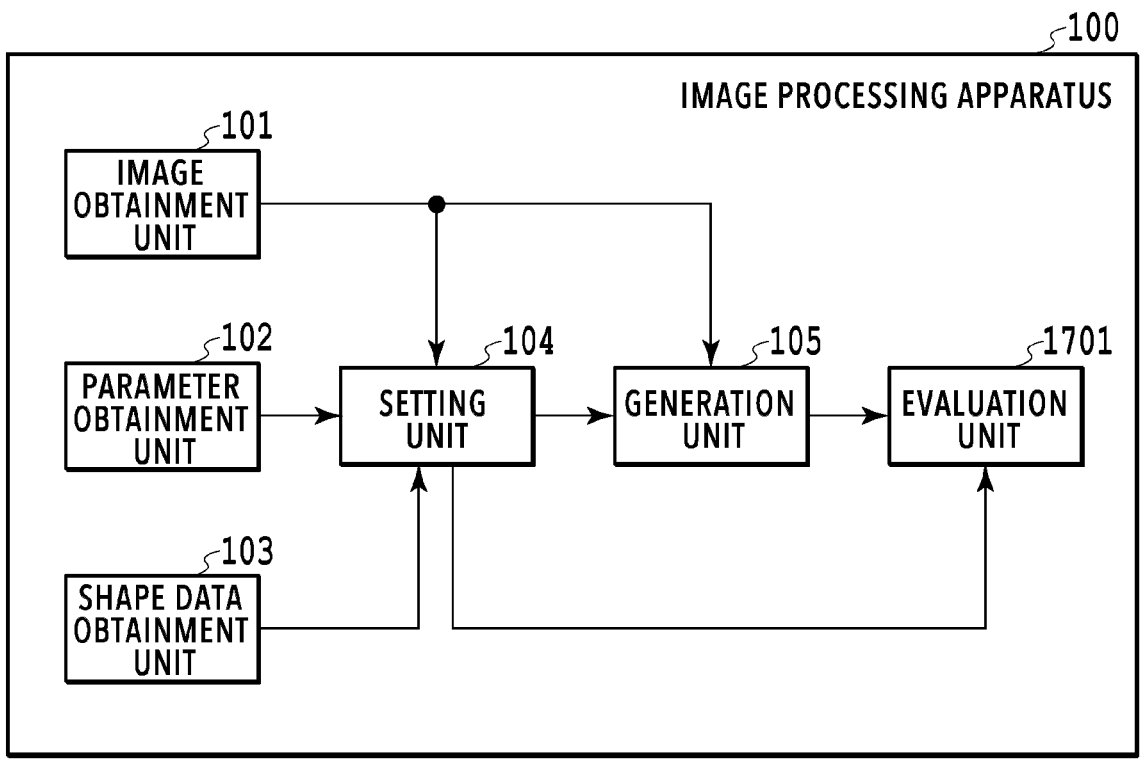
FIG. 17 is a block diagram illustrating an example of a functional configuration of the image processing apparatus according to Embodiment 3.
Figure 18:
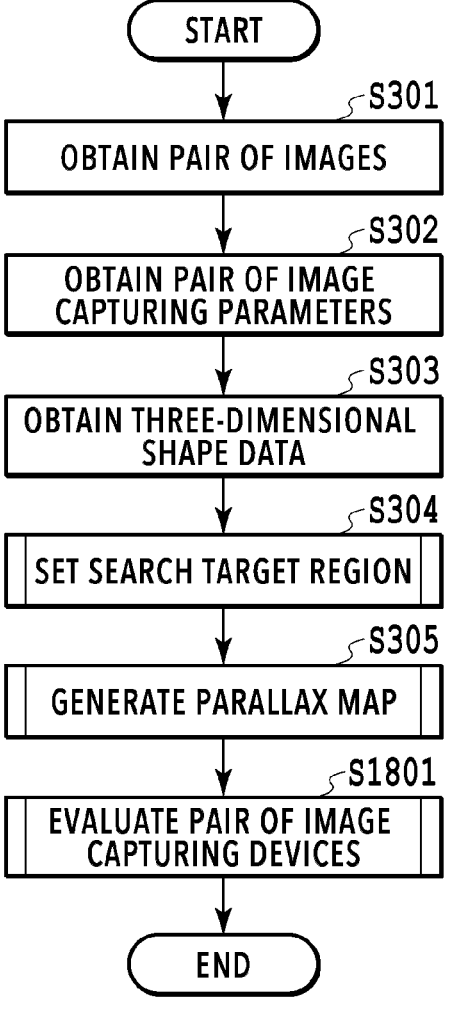
FIG. 18 is a flowchart illustrating an example of a processing flow by the CPU included in the image processing apparatus according to Embodiment 3.
Figure 19:
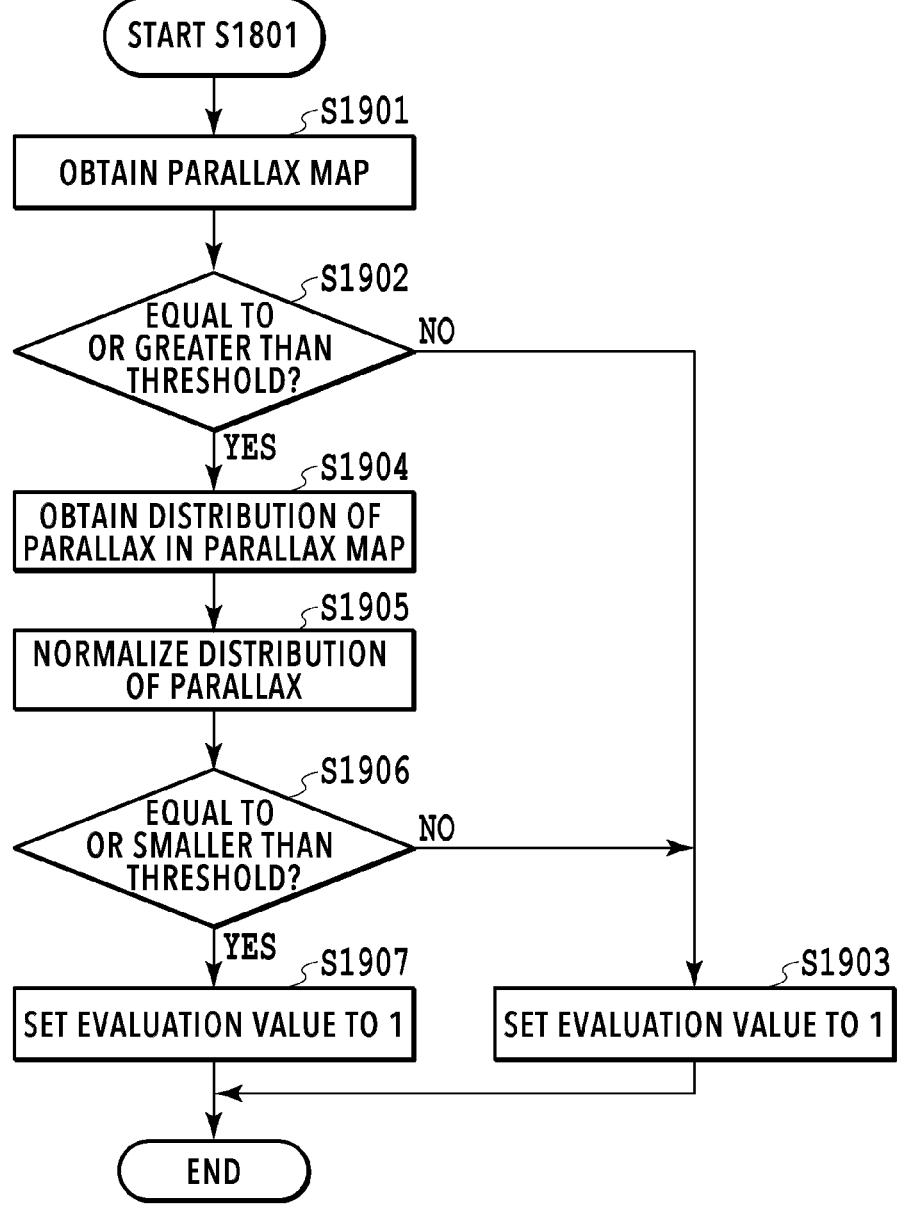
FIG. 19 is a flowchart illustrating an example of a processing flow of processing to evaluate the pair of image capturing devices by an evaluation unit according to Embodiment 3.

The image processing apparatus 100 according to Embodiment 3 is described with reference to FIGS. 17 to 19. First, a configuration of the image processing apparatus 100 according to Embodiment 3 is described with reference to FIG. 17. FIG. 17 is a block diagram illustrating an example of a functional configuration of the image processing apparatus 100 according to Embodiment 3 (hereinafter, simply described as the "image processing apparatus 100"). The image processing apparatus 100 is the image processing apparatus 100 according to Embodiment 1 to which an evaluation unit 1701 is added. The image processing apparatus 100 according to Embodiment 1 generates the parallax map. In contrast, the image processing apparatus 100 evaluates whether the pair of image capturing devices are a combination of image capturing devices that are appropriate for obtaining the parallax (hereinafter, a "stereo pair") by using the generated parallax map. Note that, hereinafter, a configuration similar to the configuration included in the image processing apparatus 100 according to Embodiment 1 and processing similar to the processing by the image processing apparatus 100 according to Embodiment 1 are denoted by the same reference numerals, and descriptions are omitted.

The evaluation unit 1701 evaluates whether the pair of image capturing devices are the stereo pair appropriate for obtaining the parallax by using the parallax map generated by the generation unit 105. Note that, as with the image processing apparatus 100 according to Embodiment 1, the processing of each unit included in the image processing apparatus 100 and illustrated in FIG. 17 is implemented by hardware such as an ASIC or an FPGA built in the image processing apparatus 100. Additionally, the processing may be implemented by software using a memory such as the RAM 203 and a processor such as the CPU 201 illustrated in FIG. 2.

<Operation of Image Processing Apparatus>

An operation of the image processing apparatus 100 is described with reference to FIGS. 18 and 19. Hereinafter, it is described that the processing by each unit included in the image processing apparatus 100 as the functional configuration is executed by the CPU 201. FIG. 18 is a flowchart illustrating an example of a processing flow of the CPU 201 included in the image processing apparatus 100 according to Embodiment 3. First, the CPU 201 executes the processing from S301 to S305. After S305, in S1801, the evaluation unit 1701 evaluates whether the pair of image capturing devices are the stereo pair appropriate for obtaining the parallax. Details of the processing in S1801 are described later. After S1801, the CPU 201 ends the processing of the flowchart illustrated in FIG. 18.

<Processing to Evaluate Pair of Image Capturing Devices>

The evaluation processing by the evaluation unit 1701 is described with reference to FIG. 19. FIG. 19 is a flowchart illustrating an example of a processing flow of the processing to evaluate the pair of image capturing devices by the evaluation unit 1701 according to Embodiment 3, that is, the processing in S1801. First, in S1901, the evaluation unit 1701 obtains the parallax map generated in S305. Next, in S1902, the evaluation unit 1701 determines whether the number of pixels in the search target region set in S304 is equal to or greater than a threshold determined in advance. If it is determined in S1902 that the number of pixels in the search target region is equal to or greater than the threshold, in S1904, the evaluation unit 1701 obtains distribution of the parallax in the parallax map obtained in S1901. Specifically, the evaluation unit 1701 obtains the distribution of the parallax in a region in the parallax map that corresponds to the search target region set in S304.

After S1904, in S1905, the evaluation unit 1701 normalizes the distribution of the parallax obtained in S1904. Based on the principle of triangulation, a value of the parallax is proportional to a product of a base line length corresponding to the distance between the pair of image capturing devices and the focal length of the pair of image capturing devices. Therefore, the evaluation unit 1701 normalizes the distribution of the parallax by dividing the parallax by the product of the base line length and the focal length. After S1905, in S1906, the evaluation unit 1701 calculates an unbiased variance of the distribution of the parallax normalized in S1905 and determines whether the calculated unbiased variance is equal to or smaller than a threshold determined in advance. If it is determined in S1906 that the unbiased variance is equal to or smaller than the threshold, in S1907, the evaluation unit 1701 sets an evaluation value of the pair of image capturing devices corresponding to the pair of images obtained in S301 to 1. If it is determined that the unbiased variance is not equal to or smaller than the threshold, or if it is determined in S1902 that the number of pixels of the search target region is not equal to or greater than the threshold, in S1903, the evaluation unit 1701 sets the evaluation value of the pair of image capturing devices corresponding to the pair of images obtained in S301 to 0.

In this case, the pair of image capturing devices in which the evaluation value is 1 are the stereo pair appropriate for obtaining the parallax, and the pair of image capturing devices in which the evaluation value is 0 are the stereo pair inappropriate for obtaining the parallax. In the above descriptions, a mode to set the evaluation value to 1 or 0 is described as an example; however, it is not limited thereto, and another numerical value, character string, or the like may be applied. After S1907 or S1903, the evaluation unit 1701 ends the processing of the flowchart illustrated in FIG. 19.

Note that, if the evaluation value is set to 0 in S1903, for example, the CPU 201 may execute the flowchart illustrated in FIG. 18 again to obtain another pair of images in S301 and may execute the processing in and after S302 based on the pair of images. Additionally, for example, in this case, after changing the pair of image capturing parameters obtained in S302, the CPU 201 may execute the flowchart illustrated in FIG. 18 again to obtain another pair of images in S301. In this case, changing the pair of image capturing parameters is changing at least one of the first image capturing parameter and the second image capturing parameter. Specifically, it is to change either of pieces of the information included in the first image capturing parameter that are the position, the orientation, the focal length, and the like of the first image capturing device, or either of pieces of the information included in the second image capturing parameter that are the position, the orientation, the focal length, and the like of the second image capturing device.

According to the image processing apparatus 100 formed as described above, it is possible to correct a positioning error of the image capturing device or to detect a positioning error of the image region in the captured image in which the object is shown. As a result, according to the image processing apparatus 100, it is possible to accurately correct the positioning error of the image capturing device or to correct the positioning error of the image region in the captured image in which the object is shown.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve an accuracy of parallax information.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-116752, filed Jul. 21, 2022 which is hereby incorporated by reference wherein in its entirety.

What is claimed is:

1. An image processing apparatus comprising:
one or more hardware processors; and
one or more memories storing one or more programs configured to be executed by the one or more hardware processors, the one or more programs including instructions for:
obtaining a first captured image obtained by image capturing by a first image capturing device and a second captured image obtained by image capturing by a second image capturing device;
obtaining a first image capturing parameter, which is an image capturing parameter in a case where the first captured image is captured, and a second image capturing parameter, which is an image capturing parameter in a case where the second captured image is captured;
obtaining three-dimensional shape data indicating a shape of an object image-captured by the first image capturing device and the second image capturing device;
obtaining parallax information on the first captured image and the second captured image based on a search point included in the first captured image and a corresponding point corresponding to the search point and included in the second captured image; and
setting a search target region limiting a range of a pixel set as the search point in the first captured image based on the first image capturing parameter, the second image capturing parameter, and the three-dimensional shape data; wherein
based on the first image capturing parameter and the three-dimensional shape data, a first position in the three-dimensional shape data that corresponds to a pixel of the first captured image is obtained,
based on the second image capturing parameter, a second position in the second captured image that corresponds to the first position is obtained,
a first depth value indicating a distance from the second position to the first position is obtained,
based on the second image capturing parameter and the three-dimensional shape data, a depth map corresponding to the second captured image is obtained,
based on the depth map, a second depth value corresponding to the second position is obtained, and
based on the first depth value and the second depth value, the search target region is set.

2. The image processing apparatus according to claim 1, wherein
the parallax information is obtained by identifying the corresponding point corresponding to the search point included in the search target region from the second captured image.

3. The image processing apparatus according to claim 1, wherein
the search target region is set as an image region corresponding to a part of the object shown in both the first captured image and the second captured image out of an image region in the first captured image in which the object is shown.

4. The image processing apparatus according to claim 1, wherein
the first position is obtained by back-projecting a position corresponding to the pixel of the first captured image to the three-dimensional shape data by using the first image capturing parameter.

5. The image processing apparatus according to claim 1, wherein
the second position is obtained by projecting the first position to the second captured image by using the second image capturing parameter.

6. The image processing apparatus according to claim 1, wherein
the depth map is obtained by projecting a position of each of a plurality of elements forming the three-dimensional shape data to the second captured image by using the second image capturing parameter.

7. The image processing apparatus according to claim 1, wherein
the search target region is set as an image region including a pixel of the first captured image in which a magnitude of a difference between the first depth value and the second depth value is equal to or smaller than a predetermined value.

8. The image processing apparatus according to claim 1, wherein
in a case where a position of an element forming the three-dimensional shape data is within a viewing angle of each of the first image capturing device and the second image capturing device, the search target region is set as an image region including a pixel of the first captured image that corresponds to the position of the element.

9. The image processing apparatus according to claim 8, wherein
based on the three-dimensional shape data and the first image capturing parameter, whether the position of the element is within the viewing angle of the first image capturing device is determined, and based on the three-dimensional shape data and the second image capturing parameter, whether the position of the element is within the viewing angle of the second image capturing device is determined.

10. The image processing apparatus according to claim 8, wherein
the pixel of the first captured image that corresponds to the position of the element is identified by projecting the position of the element to the first captured image by using the first image capturing parameter.

11. The image processing apparatus according to claim 1, wherein
the search target region is set in the first captured image after being transformed based on the first image capturing parameter and the second image capturing parameter.

12. The image processing apparatus according to claim 11, wherein
the transformation of the first captured image is transformation by stereo parallelization.

13. The image processing apparatus according to claim 1, wherein the one or more programs further include an instruction for:
correcting the three-dimensional shape data based on the parallax information, the first image capturing parameter, and the second image capturing parameter.

14. The image processing apparatus according to claim 1, wherein the one or more programs further include an instruction for:

evaluating whether a combination of the first image capturing device and the second image capturing device are appropriate as two image capturing devices forming a stereo camera based on information indicating the search target region and the parallax information.

15. An image processing method comprising the steps of:

obtaining a first captured image obtained by image capturing by a first image capturing device and a second captured image obtained by image capturing by a second image capturing device;

obtaining a first image capturing parameter, which is an image capturing parameter in a case where the first captured image is captured, and a second image capturing parameter, which is an image capturing parameter in a case where the second captured image is captured;

obtaining three-dimensional shape data indicating a shape of an object image-captured by the first image capturing device and the second image capturing device;

obtaining parallax information on the first captured image and the second captured image based on a search point included in the first captured image and a corresponding point corresponding to the search point and included in the second captured image; and setting a search target region limiting a range of a pixel set as the search point in the first captured image based on the first image capturing parameter, the second image capturing parameter, and the three-dimensional shape data; wherein based on the first image capturing parameter and the three-dimensional shape data, a first position in the three-dimensional shape data that corresponds to a pixel of the first captured image is obtained, based on the second image capturing parameter, a second position in the second captured image that corresponds to the first position is obtained, a first depth value indicating a distance from the second position to the first position is obtained, based on the second image capturing parameter and the three-dimensional shape data, a depth map corresponding to the second captured image is obtained, based on the depth map, a second depth value corresponding to the second position is obtained, and based on the first depth value and the second depth value, the search target region is set.

16. A non-transitory computer readable storage medium storing a program for causing a computer to perform a control method of an image processing apparatus, the control method comprising the steps of:

obtaining a first captured image obtained by image capturing by a first image capturing device and a second captured image obtained by image capturing by a second image capturing device;

obtaining a first image capturing parameter, which is an image capturing parameter in a case where the first captured image is captured, and a second image capturing parameter, which is an image capturing parameter in a case where the second captured image is captured;

obtaining three-dimensional shape data indicating a shape of an object image-captured by the first image capturing device and the second image capturing device;

obtaining parallax information on the first captured image and the second captured image based on a search point included in the first captured image and a corresponding point corresponding to the search point and included in the second captured image; and setting a search target region limiting a range of a pixel set as the search point in the first captured image based on the first image capturing parameter, the second image capturing parameter, and the three-dimensional shape data; wherein based on the first image capturing parameter and the three-dimensional shape data, a first position in the three-dimensional shape data that corresponds to a pixel of the first captured image is obtained, based on the second image capturing parameter, a second position in the second captured image that corresponds to the first position is obtained, a first depth value indicating a distance from the second position to the first position is obtained, based on the second image capturing parameter and the three-dimensional shape data, a depth map corresponding to the second captured image is obtained, based on the depth map, a second depth value corresponding to the second position is obtained, and based on the first depth value and the second depth value, the search target region is set.

* * * * *